(12) United States Patent
Kondratowicz et al.

(10) Patent No.: US 11,708,306 B2
(45) Date of Patent: Jul. 25, 2023

(54) GEOPOLYMER COMPOSITE AND EXPANDABLE VINYL AROMATIC POLYMER GRANULATE AND EXPANDED VINYL AROMATIC POLYMER FOAM COMPRISING THE SAME

(71) Applicant: SYNTHOS S.A., Oswiecim (PL)

(72) Inventors: Filip Lukasz Kondratowicz, Cracow (PL); Piotr Rojek, Cracow (PL); Marzena Mikoszek-Operchalska, Ruda Slaska (PL); Kamil Utrata, Cwiklice (PL)

(73) Assignee: SYNTHOS S.A., Oswiecim (PL)

( * ) Notice: Subject to any disclaimer, the term of this patent is extended or adjusted under 35 U.S.C. 154(b) by 87 days.

(21) Appl. No.: 17/178,140

(22) Filed: Feb. 17, 2021

(65) Prior Publication Data
US 2021/0276920 A1    Sep. 9, 2021

Related U.S. Application Data

(62) Division of application No. 15/543,307, filed as application No. PCT/EP2016/050594 on Jan. 14, 2016, now Pat. No. 10,961,154.

(30) Foreign Application Priority Data

Jan. 14, 2015 (EP) .................................... 15461507

(51) Int. Cl.
*C04B 28/00* (2006.01)
*C08K 3/013* (2018.01)
(Continued)

(52) U.S. Cl.
CPC .......... *C04B 28/006* (2013.01); *C08J 9/0014* (2013.01); *C08J 9/0061* (2013.01); *C08J 9/0066* (2013.01);
(Continued)

(58) Field of Classification Search
CPC ..... C04B 28/006; C08J 9/0014; C08J 9/0061; C08J 9/0066; C08J 9/141; C08J 9/16;
(Continued)

(56) References Cited

U.S. PATENT DOCUMENTS 3,393,260 A    7/1968  Miler
5,244,726 A *  9/1993  Laney ..................... C04B 28/26
                                                       106/632
(Continued)

FOREIGN PATENT DOCUMENTS

CN    1762884       4/2006
CN    101068863    11/2007
(Continued)

OTHER PUBLICATIONS

Zhang et al., "Geopolymer foam concrete: An emerging material for sustainable construction," Construction and Building Materials, 56 (2014) 113-117. (Year: 2014).*
(Continued)

*Primary Examiner* — Kara B Boyle
(74) *Attorney, Agent, or Firm* — Nixon & Vanderhye P.C.

(57) ABSTRACT

A process for the production of a geopolymer composite. The disclosure further relates to a geopolymer composite, and the use of a geopolymer, a geopolymer in combination with an athermanous additive, or the geopolymer composite in expanded vinyl polymer, preferably vinyl aromatic polymer. Furthermore, the disclosure relates to a process for the production of expandable vinyl aromatic polymer granulate, and expandable vinyl aromatic polymer granulate. Finally, the disclosure relates to expanded vinyl foam, preferably vinyl aromatic polymer, and to a masterbatch comprising vinyl polymer and a), b), or c).

21 Claims, 4 Drawing Sheets

(51) Int. Cl.

| | | |
|---|---|---|
| C08J 9/00 | (2006.01) | |
| C08J 9/18 | (2006.01) | |
| C08J 9/14 | (2006.01) | |
| C08J 9/16 | (2006.01) | |
| C08J 9/232 | (2006.01) | |
| C08K 3/34 | (2006.01) | |
| C08J 9/224 | (2006.01) | |
| C08J 9/20 | (2006.01) | |
| C08J 9/228 | (2006.01) | |

(52) U.S. Cl.
CPC .......... *C08J 9/141* (2013.01); *C08J 9/16* (2013.01); *C08J 9/18* (2013.01); *C08J 9/20* (2013.01); *C08J 9/224* (2013.01); *C08J 9/228* (2013.01); *C08J 9/232* (2013.01); *C08K 3/013* (2018.01); *C08K 3/34* (2013.01); *C08J 2201/03* (2013.01); *C08J 2201/034* (2013.01); *C08J 2201/036* (2013.01); *C08J 2203/14* (2013.01); *C08J 2203/182* (2013.01); *C08J 2205/044* (2013.01); *C08J 2205/046* (2013.01); *C08J 2325/06* (2013.01); *C08J 2325/16* (2013.01); *C08J 2400/102* (2013.01); *C08J 2400/22* (2013.01); *Y02P 40/10* (2015.11); *Y02W 30/91* (2015.05)

(58) Field of Classification Search
CPC ....... C08J 9/18; C08J 9/20; C08J 9/224; C08J 9/228; C08J 9/232; C08J 2201/03; C08J 2201/034; C08J 2201/036; C08J 2203/14; C08J 2203/182; C08J 2205/044; C08J 2205/046; C08J 2325/06; C08J 2325/16; C08J 2400/102; C08J 2400/22; C08J 3/22; C08K 3/013; C08K 3/34; C08K 3/04; Y02P 40/10; Y02W 30/91

See application file for complete search history.

(56) References Cited

U.S. PATENT DOCUMENTS

| | | | |
|---|---|---|---|
| 6,340,713 | B1 | 1/2002 | Glück et al. |
| 7,135,263 | B2 | 11/2006 | Kawakami et al. |
| 2005/0075442 | A1 | 4/2005 | Titelman et al. |
| 2007/0112082 | A1 | 5/2007 | Hahn et al. |
| 2008/0028994 | A1 | 2/2008 | Barlet-Gouedard et al. |
| 2008/0203597 | A1 | 8/2008 | Rogov et al. |
| 2008/0249199 | A1 | 10/2008 | Nising |
| 2009/0013907 | A1 | 1/2009 | Boxley et al. |
| 2010/0148110 | A1 | 6/2010 | Casalini et al. |
| 2011/0213045 | A1* | 9/2011 | Handl .................. C08J 9/0066 521/98 |
| 2011/0224316 | A1 | 9/2011 | Ferstl et al. |
| 2011/0284793 | A1 | 11/2011 | Ponticiello et al. |
| 2012/0032103 | A1 | 2/2012 | Ulanova et al. |
| 2012/0091388 | A1 | 4/2012 | Felisari et al. |
| 2012/0216716 | A1 | 8/2012 | Boxley et al. |
| 2012/0264836 | A1 | 10/2012 | Felisari et al. |
| 2012/0322905 | A1 | 12/2012 | Kusanose et al. |
| 2014/0001394 | A1 | 1/2014 | Nowe et al. |
| 2014/0005302 | A1 | 1/2014 | Briand et al. |
| 2014/0184249 | A1 | 7/2014 | Saafi et al. |
| 2014/0342156 | A1* | 11/2014 | Seo .................. C04B 24/04 428/402 |
| 2015/0114641 | A1 | 4/2015 | Bestaoui-Spurr et al. |

FOREIGN PATENT DOCUMENTS

| | | |
|---|---|---|
| CN | 102307937 | 1/2012 |
| CN | 102666686 | 9/2012 |
| DE | 198 28 250 | 12/1999 |
| DE | 10341298 | 3/2005 |
| DE | 10 2004 034 516 | 2/2006 |
| DE | 10 2004 058 583 | 6/2006 |
| DE | 10 2013 001 927 | 8/2014 |
| EP | 0 620 246 | 10/1994 |
| EP | 0 632 522 | 1/1995 |
| EP | 0 856 353 | 8/1998 |
| EP | 0 863 175 | 9/1998 |
| EP | 1 031 600 | 8/2000 |
| EP | 0 981 574 | 9/2000 |
| EP | 1 159 338 | 12/2001 |
| EP | 1 661 940 | 5/2006 |
| EP | 1 693 413 | 8/2006 |
| EP | 1 771 502 | 4/2007 |
| EP | 1 892 034 | 2/2008 |
| EP | 2 025 961 | 2/2009 |
| EP | 1 758 951 | 5/2010 |
| EP | 3 245 247 | 12/2018 |
| EP | 3 245 172 | 1/2019 |
| FR | 2 964 113 | 3/2012 |
| JP | 63183941 | 7/1988 |
| JP | 7-022834 | 1/1995 |
| JP | 8-311232 | 11/1996 |
| JP | 2001-151900 | 6/2001 |
| JP | 2001-250423 | 9/2001 |
| JP | 2001-279014 | 10/2001 |
| JP | 2002-121310 | 4/2002 |
| JP | 2007-514027 | 5/2007 |
| JP | 2009-144134 | 7/2009 |
| JP | 2010-527391 | 8/2010 |
| JP | 2012-136712 | 7/2012 |
| JP | 2012-526170 | 10/2012 |
| JP | 2013-507477 | 3/2013 |
| JP | 2013-159632 | 8/2013 |
| JP | 2014-80514 | 5/2014 |
| JP | 2014-148661 | 8/2014 |
| KR | 10-1034033 | 5/2011 |
| KR | 10-1431002 | * 9/2014 |
| KR | 101431002 | 9/2014 |
| WO | WO 97/45477 | 12/1997 |
| WO | WO 98/31644 | 1/1998 |
| WO | WO 98/51734 | 11/1998 |
| WO | WO 00/43442 | 7/2000 |
| WO | WO 02/055594 | 7/2002 |
| WO | WO 2004/087798 | 10/2004 |
| WO | WO 2005/123816 | 12/2005 |
| WO | WO 2006/007995 | 1/2006 |
| WO | WO 2006/058733 | 6/2006 |
| WO | WO 2006/061571 | 6/2006 |
| WO | WO 2008/061678 | 5/2008 |
| WO | WO 2008/141766 | 11/2008 |
| WO | WO 2009/009089 | 1/2009 |
| WO | WO 2010/128369 | 11/2010 |
| WO | WO 2010/141976 | 12/2010 |
| WO | WO 2010/149624 | 12/2010 |
| WO | WO 2011/042800 | 4/2011 |
| WO | WO 2011/092250 | 8/2011 |
| WO | WO 2012/024708 | 3/2012 |
| WO | WO 2012/024709 | 3/2012 |
| WO | WO 2012/032022 | 3/2012 |
| WO | WO 2012/052423 | 4/2012 |
| WO | WO 2013/044016 | 9/2012 |
| WO | WO 2012/146577 | 11/2012 |
| WO | WO 2015/065710 | 5/2015 |

OTHER PUBLICATIONS

International Search Report for PCT/EP2016/050594, dated Apr. 6, 2016, 4 pages.
Written Opinion of the ISA for PCT/EP2016/050594, dated Apr. 6, 2016, 8 pages.
International Preliminary Report on Patentability for PCT/EP2016/050594, dated Apr. 21, 2017, 17 pages.
Human Translation of KR 10-1431002 [published: Sep. 22, 2014; inventor(s): Song].
Office Action issued in CN Appln. No. 201680015803.1 dated May 20, 2020 (w/ partial translation).
Encyclopedia of Chinese Chemical Commodities, China Materials Press, p. 3642 (1995)*.

(56) References Cited

OTHER PUBLICATIONS

"Handbook of Industrial Requirements for Mineral Resources" Geological Publishing House, p. 311 (Mar. 31, 2014)*.
Yuan et al., "Suspension Polymerization" *Journal of Macromolecular Science, Part C: Polymer Reviews*, C31: 2 & 3, 215-299 (1991).
Search Report issued in EP Appln. No. 19150362.2 dated Mar. 18, 2019.
Office Action issued in U.S. Appl. No. 15/543,336 dated Mar. 19, 2019.
Notice of Opposition issued in EP Appln. No. 16700595.8 dated Jun. 5, 2019.
Busico et al., "Physical Characterization of Layered Perovskites—Polystyrene Composites" *Journal of Applied Polymer Science*, vol. 25: 2857-2868 (1980).
Encyclopedia of Polymer Science and Technology, Concise Third Edition, p. 43 (2007).
Last, "Infrared-Absorption Studies on Barium Titanate and Related Materials" *Physical Review*, vol. 105, No. 6: 1740-1750 (Mar. 15, 1957).
Luxon et al., "Effect of Particle Size and Shape on the Infrared Absorption Spectra of Barium Titanate and Strontium Titanate Powders" *Journal of Applied Physics*, vol. 41, No. 6: 2303-2307 (May 1970).
Posch et al., "Infrared Properties of Solid Titanium Oxides: Exploring Potential Primary Dust Condensates" *The Astrophysical Journal Supplement Series*, vol. 149: 437-445 (Dec. 2003).
Random House Webster's Unabridged Dictionary, Second Edition, propagation to prophylaxis, 1 page (1998).
Roth, "Classification of Perovskite and Other $ABO_3$-Type Compounds" *Journal of Research of the National Bureau of Standards*, vol. 58, No. 2: 75-88 (Feb. 1957).
Sheng et al., Catalytically Synergistic Effects of Novel $LaMnO_3$ Composite Metal Oxide in Intumescent Flame-Retardant Polypropylene System *Polymer Composites*, pp. 2390-2400 (2014).
Tarun et al., "Infrared absorption of hydrogen-related defects in strontium titanate" *Journal of Applied Physics*, vol. 109: 063706-1-063706-4 (2011).
Win et al., "Synthesis of Barium Titanate from Titanyl Acylate Precursor by Sol-precipitate Method" *Jour. Myan. Acad. Arts & Sc.*, vol. VI, No. 1: 61-70 (2008).
Zhang et al., "Preparation and Characterization of Calcium Titanate ($CaTiO_3$) Whiskers via Molten Salt Method" *Advanced Materials Research*, vol. 630: 89-92 (2013).
Written Opinion of the ISA for PCT/EP2016/050637, dated Apr. 7, 2016.
Office Action issued in JP Appln. No. 2017-537278 dated Oct. 8, 2019 (w/ translation).
Office Action issued in JP Appln. No. 2017-537274 dated Oct. 15, 2019 (w/ translation).
Office Action issued in JP Appln. No. 2017-537284 dated Jun. 4, 2019 (w/ translation).
Office Action issued in U.S. Appl. No. 15/543,336 dated Dec. 16, 2019.
Opposition filed against EP Patent No. 3 245 247 (Appln. No. 16701911.6) dated Sep. 26, 2019.
Opposition filed against EP Patent No. 3 245 172 (Appln. No. 16700584.2) dated Oct. 9, 2019.
Submission by Applicant in EP Appln. No. 16701911.6 dated Apr. 3, 2018.
Submission by Applicant (accompanying Demand) in PCT/EP2016/050627 dated Nov. 14, 2016.
De Weerdt, "Geopolymers—State of the art" *COIN Project Report* 37 (2011).
Duxson et al., "Geopolymer technology: the current state of the art" *Journal of Materials Science* vol. 42, No. 9: 2917-2933 (2007).
IUPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook.
Škvára, "Alkali Activated Materials or Geopolymers?" *Ceramics Silikaty*, vol. 51, No. 3: 173-177 (2007).
Technical Bulletin Fine Particles by Degussa AG, No. 11, pp. 1-71 (2006).
Office Action issued in CN Appln. No. 201680015357.4 dated Jan. 2, 2020 (w/ translation).
Office Action issued in CN Appln. No. 201680015877.5 dated Dec. 2, 2019 (w/ translation).
Office Action issued in IN Appln. No. 201717024821 dated Jan. 9, 2020.
Office Action issued in IN Appln. No. 201717024832 dated Dec. 19, 2019.
Office Action issued in BR Appln. No. 112017014925-7 dated Jan. 27, 2020 (w/ partial translation).
Office Action issued in BR Appln. No. 112017014972-9 dated Jan. 21, 2020 (w/ partial translation).
International Preliminary Report on Patentability for PCT/EP2016/050616, dated Jul. 18, 2017.
International Preliminary Report on Patentability for PCT/EP2016/050627, dated Apr. 26, 2017.
International Preliminary Report on Patentability for PCT/EP2016/050637, dated Jun. 2, 2017.
International Search Report for PCT/EP2016/050616, dated Mar. 30, 2016.
International Search Report for PCT/EP2016/050627, dated Apr. 11, 2016.
International Search Report for PCT/EP2016/050637, dated Apr. 7, 2016.
Letter accompanying the Demand dated Nov. 14, 2016 from Synthos S.A. to EPO in PCT/EP2016/050627 with experimental report of Nov. 14, 2016 with Annexes 1 and 2.
Naoki, "Dielectric cellular moldings with improved dimensional stability for spherical Luneburg lenses", Chemical Abstracts Service, XP002741017, Oct. 10, 2001 (refers to JP 2001-279014).
Shigehiko et al., "Manufacture of foamable resin particles containing ceramics", Chemical Abstracts Service, XP002741016, Feb. 17, 1997, 2 pages (refers to JP 8-311232).
U.S. Office Action issued in U.S. Appl. No. 15/543,319 dated Apr. 3, 2018.
Office Action issued in EP Appln. No. 19 150 362.2 dated May 20, 2021.

* cited by examiner

Structure of the ideal cubic perovskite (ABO$_3$), where A represents cation, B represents cation, and O represents oxygen anions forming an octahedron.

TGA of Geopolymer Composite 1

GEOPOLYMER COMPOSITE AND EXPANDABLE VINYL AROMATIC POLYMER GRANULATE AND EXPANDED VINYL AROMATIC POLYMER FOAM COMPRISING THE SAME

CROSS-RELATED APPLICATIONS

This application is a divisional of U.S. application Ser. No. 15/543,307 filed Jul. 13, 2017 which is the U.S. national phase of International Application No. PCT/EP2016/050594 filed 14 Jan. 2016, which designated the U.S. and claims priority to EP Patent Application No. 15461507.4 filed 14 Jan. 2015, the entire contents of each of which are hereby incorporated by reference.

The present invention relates to a process for the production of a geopolymer composite. It further relates to a geopolymer composite, and the use of a) a geopolymer, b) a geopolymer in combination with an athermanous additive, or c) the geopolymer composite, in expanded vinyl polymer foam, preferably expanded vinyl aromatic polymer foam. Furthermore, the invention relates to a process for the production of expandable vinyl aromatic polymer granulate, and expandable vinyl aromatic polymer granulate. Finally, the present invention relates to expanded vinyl polymer foam, preferably expanded vinyl aromatic polymer foam, and to a masterbatch comprising vinyl polymer and a), b), or c).

Vinyl aromatic polymers are known and are used for the preparation of expanded products that are adopted in various applications, of which the most important one is for thermal insulation. This is why there is a continuously increasing demand for expanded vinyl aromatic polymers with low thermal conductivity as well as good mechanical and self-extinguishing properties.

It is generally known that the addition of athermanous additives from the group of heat absorbers (e.g. carbon black), heat scatterers (e.g. minerals from the group of silicas and titanium oxides) and heat reflectors (e.g. aluminium pigment and graphite) decreases the thermal conductivity of polymers. Examples for such types of polymers are those obtained by suspension polymerization of vinyl aromatic monomers (in particular of styrene) and optionally comonomers. Other examples for such type of polymers are those obtained by the extrusion of general purpose polystyrene or its copolymers.

Typically, the addition of a combination of athermanous additives that can absorb or scatter heat radiation to prolong the IR rays' pathway results in a significant reduction of thermal conductivity. However, the most advantageous effect results from the addition of IR reflectors. A combination of IR scatterers and IR reflectors can influence the reduction of the concentration of typical IR absorbers (such as carbon black) and leads to an improvement of the self-extinguishing effect of polystyrene foams. However, an addition of carbon black, especially in extrusion processes, requires the addition of a relatively high amount of brominated flame retardant, to maintain acceptable self-extinguishing properties.

A further problem is the required proper dispersion of carbon black in the polymer phase. The uniform dispersion can only be achieved when adequate shearing forces are applied in the extruder.

Poor thermal stability of foams made of vinyl aromatic polymers filled with carbon-based athermanous additives is also a problem. Such foams, having black or grey colour, absorb a relatively high amount of heat energy, thus the insulation boards made thereof and applied on building walls can shrink or deform significantly. Thus, the insulation performance may deteriorate. Finally, when trying to create an optimum cell structure with a narrow cell size distribution, in order to obtain materials with significantly decreased thermal conductivity, several problems were identified when using carbon black, graphite or especially mineral athermanous additives, because these additives also act as nucleating agents and have a negative effect on bubble formation.

US 2008/0 249 199 A1 teaches a method for the manufacture of foamed or foamable particles from a polymer melt. A recycled polymer melt is introduced into the polymer melt through a side extruder and may include additive. This is said to be more economical than the use of a masterbatch. If bromide-containing flame protection agents or other thermally unstable additives are present in the recycled polymer, or are added to the recycled polymer, the process temperature in the side extruder and in all following system components should not exceed a temperature and dwell time limiting value which is defined by the thermal stability of the additives.

WO 2006/058733 A1 teaches expandable styrene polymer granulates containing a) athermanous additive selected from the group of inorganic powder materials such as silicic acid and b) carbon black or graphite. Further, EP 0 863 175, EP 0 981 574, EP 1 758 951 and EP 1 771 502 A2 teach the use of graphite in polystyrene foam obtained by an extrusion process.

WO 2006/058733 also teaches that the mechanical properties of thermoplastic polymers containing fillers can be improved by using adhesion promoters (coupling agents), such as maleic anhydride modified styrene copolymers, epoxy group containing polymers, organosilanes or styrene copolymers having isocyanate or acid group. Similar to US 2008/0 249 199 A1, WO 2006/058733 A1 also proposes to use side extruders for introducing additives such as solids and thermally sensitive additives. This arrangement is, however, undesirable in situations where additives that are not thermally sensitive, but rather require thorough mixing, are to be introduced. This is because large amounts of material would need to be processed if additives that require thorough mixing were to be introduced into a main portion of the polymer. This is economically undesirable. The addition of dedicated coupling agents is likewise undesirable, especially if they need to be used in large amounts.

WO 2004/087798 A1 teaches expandable vinyl aromatic polymers comprising, in a polymer matrix, a type of carbon black having an active surface area ranging from 5 to 40 $m^2/g$. The thermal conductivity of a material with a density of 14 g/l is reported to be 36.5 mW/m*K.

WO 2006/061571 A1 teaches an expandable polystyrene composition comprising carbon black as an additive, the carbon black having a very high BET surface, as measured according to ASTM D 6556, ranging from 550 to 1,600 $m^2/g$. The examples report polystyrene foam with a thermal conductivity of 36.16 mW/m*K at density 13.3 g/l according to ASTM D 1622, and 34.21 mW/m*K at density 19.4 g/l, respectively.

WO 2008/061678 A2 discloses the use of carbon black having a specific electric conductivity, to reduce the thermal conductivity of expandable vinyl aromatic polymers. The carbon black is introduced during suspension polymerization, or during polymer extrusion. The examples report polystyrene foam having a thermal conductivity of 31.0 mW/m*K at a density of 17 g/l.

Japanese patent JP 63183941 teaches the use of aluminium pigment, titanium dioxide and graphite, having specific particle size and heat radiation reflectivity, to reduce the thermal conductivity of polystyrene foams. Examples 7 to 11 teach polystyrene foam produced by an extrusion process and having a thermal conductivity of 25 to 30 mW/m*K, where master batches were used as starting material.

WO 2005/123816 A1 teaches styrene polymer particle foam materials.

WO 2004/087798 A1 teaches expandable polystyrenes containing carbon black. In a suspension polymerization process, the carbon black is present during the polymerization in aqueous suspension. Also disclosed is a continuous process for preparing expandable polystyrene in mass, wherein the polymer is fed together with carbon black into an extruder, and, subsequently, expanding agent and possible further additives are injected into the molten polymer before extrusion through a die.

WO2010/128369 A1 teaches thermoinsulating expanded articles comprising an expanded polymeric matrix, obtained by expansion and sintering of beads/granules of a vinyl aromatic (co)polymer, in whose interior a filler is homogeneously dispersed, which comprises at least one athermanous material selected from coke, graphite and carbon black and optionally an active inorganic additive within the wavelengths ranging from 100 to 20,000 $cm^{-1}$.

US2012/264836 A1 teaches nanocomposite compositions based on expandable thermoplastic polymers which comprise: a) a polymeric matrix, b) expanding agent englobed in the polymeric matrix; c) athermanous filler comprising nano-scaled graphene plates having specific dimensions.

US 2008/0028994 A1 entitles "Geopolymer Compositions and Application in Oilfield Industry" teaches a geopolymer composition formed from a suspension comprising an aluminosilicate source, a metal silicate, an alkali activator, and a carrier fluid. Lightweight particles and/or heavyweight materials may be added to control density of the composition. Barium sulfate or ilmenite are examples for heavy particles.

WO 2010/141 976 A1 entitles "Concrete Aggregate" discloses polymeric aggregates produced from fly ash combined with an activator. The aggregate is used in concrete, mortar, or road base. WO2009/009089 A1 discloses a process for treating fly ash to render it highly usable as a concrete additive.

As mentioned, one of the solutions to decrease the thermal conductivity of expanded vinyl polymers is the addition of athermanous additives. However, the presence of athermanous additives often leads to a deterioration of the self-extinguishing and mechanical properties of the expanded vinyl aromatic polymer (i.e. foam). Consequently, a higher concentration of flame retardant must be used to achieve suitable performance for passing the flammability test according to the German industry standard DIN 4102 (B1, B2) or European standard EN ISO 11925-2. Further, when using types of carbon black having a highly developed active surface, such as a BET surface of above 40 $m^2/g$, or poor forms of graphite containing graphitic carbon in a concentration of well below 99% and having a high content of sulphur and ash, the self-extinguishing properties are insufficient in order to pass DIN 4102 (B1, B2) or even EN ISO 11925-2 (which is a less demanding test).

On the other hand, the presence of small amounts of athermanous additives of the heat scatterer type, e.g. minerals (such as silicas, calcium phosphates and minerals with perovskite structure), does not cause a substantial deterioration of the flame retarded polymer foam's self-extinguishing properties. Rather, these properties are improved, but the decrease of the foam's thermal conductivity is not as pronounced as it would be in the case of foams comprising carbon-based additives, i.e. comprising athermanous additives of the heat absorber or of the heat reflector type (in particular carbon blacks and/or graphites).

Finally, there are certain types of carbon-based athermanous additives of the heat absorber or heat reflector type (especially carbon black and graphite) that have properties that make these additives wholly unsuitable for use in expandable vinyl aromatic polymers and expanded vinyl aromatic polymer foams.

It has now surprisingly been found that these problems with expandable vinyl aromatic polymers can be overcome by the incorporation of a geopolymer, preferably in combination with athermanous additive, or of a novel geopolymer composite based on athermanous additive.

Thus, it has been found in accordance with the present invention that the use of:
 a) a geopolymer;
 b) a combination of geopolymer with athermanous additive; or
 c) a geopolymer composite with athermanous additive in expanded polymer foam made from vinyl monomer and optionally one and more comonomers (i.e. homopolymer or copolymer) decreases the thermal conductivity of the expanded foam (the decrease being measured according to ISO 8301), without adversely affecting the foam's self-extinguishing and mechanical properties.

Thus, the addition of geopolymer or its composite as prepared with various types of athermanous additives makes it possible to maintain the foam's self-extinguishing and mechanical properties in the same range as in an expanded polymer without addition of filler or any other athermanous additive, while at the same time the thermal conductivity can be decreased significantly. This is possible because the geopolymer itself gives fire resistance, and further encapsulates the particles of athermanous additive, especially of those additives based on carbon or mineral, and separates them from any disadvantageous interactions with the flame, the polymer, or the flame retardant. The presence of geopolymer further decreases thermal conductivity, because of its own heat radiation scattering effect.

Moreover, the present invention allows one to use certain types of athermanous additives that would otherwise be unsuitable for use in expandable vinyl aromatic polymers and expanded vinyl aromatic polymer foams.

The present invention has the following aspects:
 I) a process for the production of geopolymer composite, from a geopolymer and an athermanous additive;
 II) the geopolymer composite;
 III) the use of i) a geopolymer, of ii) the combination of a geopolymer with an athermanous additive and of iii) a geopolymer composite, in expanded vinyl polymer foam;
 IV) a process for the production of expandable vinyl aromatic polymer granulate that contains vinyl aromatic polymer, one or more propellants and i) a geopolymer, ii) the combination of a geopolymer with an athermanous additive and of iii) a geopolymer composite in: 1) an extrusion process or 2) a suspension process;
 V) an expandable vinyl aromatic polymer granulate;
 VI) an expanded vinyl polymer foam; and
 VII) a masterbatch comprising vinyl polymer and a), b), and/or c).

Geopolymers

The geopolymers as used according to the present invention are a class of synthetic inorganic aluminosilicate materials formed by reaction of an aluminosilicate with a polysilicate solution under strong alkaline conditions. Under these conditions, free $SiO_4$ and $AlO_4^-$ tetrahedral units are generated and are linked to yield polymeric precursors by sharing all oxygen atoms between two tetrahedral units, while water molecules are released. The tetrahedral units are balanced by group I cations ($Na^+$, $K^+$, $Li^+$, $Ca^{2+}$, $Ba^{2+}$, $NH_4^+$, $H_3O^+$, which are present in the framework cavities and balance the negative charge of $Al^{3+}$ in tetrahedral coordination (i.e. $AlO_4^-$). Additionally, this class of materials demonstrates ceramic-like properties, including extreme fire resistance. Geopolymers can be amorphous or crystalline materials. They possess a microstructure on a nanometer scale (as observed by TEM) which comprises small aluminosilicate clusters with pores dispersed within a highly porous network. The cluster size is typically between 5 and 10 nm.

Generally, the synthesis of geopolymers from aluminosilicate materials takes place by the so-called geopolymerization process, which involves polycondensation phenomena of aluminate and silicate groups with formation of Si—O—Al type bonds. The original raw material used by Davidovits is metakaolinite, activated by sodium (or potassium) hydroxide and sodium (or potassium) silicate. Subsequently, Van Devender found that many other Si—Al materials could become the sources for making geopolymers, such as fly ash, furnace slag, silica fume, mine tailings, pozzolan, kaolin, building residues, and some natural minerals. After approximately several hours of curing, these materials exhibit excellent features such as light weight and high strength, but are also ideally fire resistant, with non-toxic fumes and smokes, and resist all organic solvents.

According to the present invention, athermanous additive (especially carbon-based additive) becomes encapsulated into the geopolymer matrix during the process for the production of geopolymer composite. This limits the contact (interphase) between (especially carbon-based) athermanous additive, in particular when using carbon black and graphite as athermanous additive, with brominated flame retardant (especially a polymeric one based on polystyrene-butadiene rubber). It is well known that carbon black is a strong radical scavenger. The high shear forces applied for instance in a twin-screw co-rotating extruder cause a degradation of polymeric brominated flame-retardant based on styrene-butadiene rubber, with radical cross-linking and hydrogen bromide elimination. The self-extinguishing properties are typically significantly reduced due to this fact. The encapsulation of athermanous additive (especially carbon-based additive) in a fire-resistant and low-cost inorganic matrix is consequently very advantageous. The encapsulation generally blocks any radical reactions with athermanous additive (especially carbon-based additive) which would otherwise reduce the effectiveness of brominated flame retardant. Encapsulation of athermanous additive (especially carbon-based additive) by the geopolymer matrix makes it completely inert to radical reactions with polymeric brominated flame retardant and inactive in the radical process that inhibits flame retardancy in which bromine radicals play the major part. This effect in turn allows for a decrease of the required amount of brominated flame retardant in expanded vinyl aromatic polymer foam.

Also, the addition of a geopolymer or the geopolymer composite stabilizes the foam's structural uniformity. Because the nanoporous structure of geopolymers has a strong capability for the sorption of hydrocarbons, it was found that by sorption of blowing agent and then its desorption during the foaming process allows that a very similar structure can be obtained independently from the content of geopolymer or geopolymer composite in the expandable vinyl aromatic polymer granulate. It was surprisingly found that a uniform cell structure is beneficial for thermal conductivity decrease. White-coloured foams with reduced thermal conductivity and high thermal stability compared to the standard expanded polystyrene foams can also be prepared according to the present invention.

Another significant advantage is that the geopolymer and the geopolymer composite, when applied in expandable vinyl aromatic polymer granulate production, have a strong ability to modify polymer viscosity during extrusion processes and also in the polymerization of vinyl aromatic monomers and optionally comonomers in suspension processes. Strong ionic forces are created by the geopolymer chains and relax cohesive force which bond macromolecules of polymer in the molten state. It was found that the pressure in the extrusion process can be reduced significantly and polymer flow in the die plate could be considerably improved too.

When preparing vinyl aromatic polymer according to the invention by suspension polymerization, it was found that the addition of a geopolymer or the novel geopolymer composite has a very beneficial influence on stability, and the content of the main particle fraction with a particle size of 0.5 to 1.6 mm is increased to >90%, preferably >95%, in particular >98%, while the smaller (<0.3 mm) and larger (>2.5 mm) fractions are reduced to a minimum.

Also, in the moulding process, the blocks are better welded. The foaming process requires a smaller amount of steam and a lower pressure, to achieve low foam densities (below 12 kg/m$^3$ in the second step, and below 15 kg/m$^3$ in the first step). Beneficially, in comparison to the expanded articles made of expandable vinyl aromatic polymers containing carbon black or graphite for example, i.e. without geopolymer, the cooling times of the blocks in the moulds are very short and identical as for white material without containing any athermanous additive. The expanded foam is also more thermally stable.

Another benefit is a much better adhesion of foams (containing geopolymer or geopolymer composite) to those glues that are normally used to stick foam plates to surfaces when insulating houses or buildings. An even significantly better effect can be achieved when geopolymer paste is used as a glue for foam plates containing geopolymer or geopolymer composite. Because of the higher porosity of expanded foams (caused by the geopolymer's presence), the standard EPS glues can much better penetrate the plate surface and thus the adhesion is significantly improved. When, according to the invention, the geopolymer or the geopolymer composite are present in the foam, and the geopolymer-based glue is used, the adhesion is even more pronounced because there is a stronger interaction between the foam and the glue. In addition, the geopolymer-based glues have better adhesion to concrete-based material, because they are partially chemically identical.

This novel type of athermanous additive according to the invention is suitable for decreasing thermal conductivity and for improving durability, thermal stability, and self-extinguishing properties, and for the easier processing of expandable vinyl aromatic polymer granulate and of the expanded foam products made thereof.

Also, it is expected that these improvements are possible when this new type of athermanous additive is used in other expandable vinyl polymers such as polyethylene and polypropylene. In general, several processing improvements are expected in extrusion and injection moulding of vinyl aromatic and non-aromatic polymers, when geopolymer, its combination with athermanous additive, or geopolymer composite is used as additive.

DETAILED DESCRIPTION

In a first aspect, the present invention relates to (I) a process for the production of a geopolymer composite, from an aluminosilicate component and an athermanous additive component.

Generally, the process for the production of a geopolymer composite according to the invention comprises the following steps:
a) mixing of an aluminosilicate component with an alkaline silicate solution, to form a gel,
b) adding of an athermanous additive component to the gel, to form a filled gel,
c) mixing of the filled gel, to form filled geopolymer, d) curing, drying and milling, to give the filled geopolymer particles,
e) optional removal of cations from the filled geopolymer particles, and subsequent drying, and
f) obtaining the geopolymer composite.

In the first step a), the mixing of the aluminosilicate component, in particular dehydroxylated kaolinite, metakaolin or metakaolinite, with an alkaline silicate solution, generally sodium or potassium silicate, forms so-called "gel". In second step b), an athermanous additive component is incorporated into the gel, i.e. the forming geopolymer. The mixing is in a third step c) continued, and geopolymerization proceeds, and the geopolymer chains encapsulate the athermanous additive. During the mixing in the third step c), water can be introduced as viscosity modification additive.

Once the curing (geopolymerization) process has substantially come to an end, drying of the filled geopolymer blocks in a fourth step d) evaporates excess of water. Blocks of geopolymer are preliminary milled to form filled geopolymer particles (ballast). The ballast is dried, preferably in rotating cylindrical dryers at higher temperature, to remove any remaining water. The ballast is then milled, to obtain a suitable particle size.

The optional fifth step e) is the elution of cations from the geopolymer, preferably by addition of concentrated (hydrochloric) acid to the suspended filled geopolymer particles in water, and subsequent drying. The cations may negatively influence the thermal stability of brominated flame retardants, especially of polymeric styrene-butadiene brominated rubbers.

In a preferred process according to the invention, that does in fact include step e), this step preferably comprises removal of cations with an acid solution, and subsequent drying.

It is in particular preferred that the process according to the invention in fact includes step e), and step e) in addition to comprising removal of cations with an acid solution further comprises washing with water. Then follow filtration and concentration of the geopolymer composite suspension, and finally, a drying process.

In a sixth step f) of the process, the geopolymer composite is obtained. The particle shape and particle size of a geopolymer composite as obtained according to the invention was also established by an SEM measurement (see FIG. 1).

Preferably, the aluminosilicate component comprises one or more selected from the group consisting of metakaolin, metakaolinite, metafly ash, furnace slag, silica fume, mine tailings, pozzolan, kaolin, and building residues, more preferably the aluminosilicate component comprises one or more selected from the group consisting of metakaolin or metakaolinite, metafly ash and silica fume,
in particular the aluminosilicate component is metakaolin or metakaolinite, or a mixture thereof.

Preferably, the athermanous additive component comprises one or more athermanous additives selected from the group consisting of
a. carbon black, petroleum coke, graphitized carbon black, graphite oxides, various types of graphite (especially poor and amorphous forms with a carbon content in the range of from 50 to 90%) and graphene, and
b. titanium oxides, ilmenite, rutiles, chamotte, fly ash, fumed silica, hydromagnesite/huntite mineral, barium sulfate and mineral having perovskite structure,
preferably the athermanous additive component comprises one or more carbon-based athermanous additives selected from the group of heat absorbers and heat reflectors,
in particular the athermanous additive component is carbon black, graphite, or a mixture thereof.

As far as b. is concerned, it is generally and in all aspects of the invention preferred that the athermanous additive component comprises one or more athermanous additives selected from the group consisting of titanium oxides, rutiles, chamotte, fly ash, fumed silica, hydromagnesite/huntite mineral, and mineral having perovskite structure.

It is further preferred in the process according to the invention that the alkaline silicate comprises one or both of sodium silicate and potassium silicate, in particular the alkaline silicate is potassium silicate.

It is further preferred that silane is added to the aluminosilicate component, prior to mixing with the alkaline silicate solution in step a). Alternatively, or additionally, silane is preferably added to the geopolymer composite, after optional step e) and preferably after step f).

Preferably, the silane is selected from aminopropyltriethoxysilane, aminopropyltrimethoxysilane, phenyltriethoxysilane, and mixtures thereof.

It is most preferred that the silane is selected from 0.01 to 10 wt. %, more preferably in the range of from 0.05 to 5 wt. %, most preferably from 0.1 to 3 wt. %, based on the weight of geopolymer composite, and mixtures thereof.

Preferably, the process proceeds as follows:
i) Mixing of the aluminosilicate component, e.g. a dehydroxylated kaolinite (metakaolin or metakaolinite) mixed with calcium silicate in a weight ratio range of from 10/1 to 10/5, preferably from 10/1 to 10/3 in alkali solution of polysilicate, generally sodium or potassium silicate. In the mixing process, the dissolution and hydrolysis of the aluminosilicate component takes place in alkali silicate solution and results in the formation of $[M_z(AlO_2)_x(SiO_2)_y \cdot MOH \cdot H_2O]$ gel. The polymerization can be described by the following equations:

$$\text{Al—Si material (s)} + \text{MOH (aq)} + \text{Na}_2\text{SiO}_3 \text{ (s or aq)} \quad (1)$$

$$\text{Al—Si material (s)} + [M_z(AlO_2)_x(SiO_2)_y \cdot n\text{MOH*}_m\text{H}_2\text{O}] \text{ gel} \quad (2)$$

$$\text{Al—Si material (s) } [M_z((AlO_2)_a(SiO_2)_b)_n \cdot \text{MOH*}_m\text{H}_2\text{O}] \text{ geopolymer} \quad (3)$$

The formation of gel is the dominant step in the geopolymerization reaction, which takes place after dissolution. The mixing is continued for a suitable time period to achieve the best dissolution of aluminosilicate and is preferably performed in a planetary mixer. The mixing time should be adjusted depending on the amount of loaded components and is preferably in a range of from 5 to 30 min.

The weight ratio of alkali silicate solution to the metakaolin is preferably at most 1/1, more preferably at most 9/10, most preferably about 8/10. Mixing is carried out at ambient temperature for a minimum of 5 min. and a maximum of 60 min. In this step, before the addition of the alkaline silicate solution, a silane is preferably added to the metakaolin in order to further improve adhesion of geopolymer in particular to carbon-based athermanous additives.

The concentration of silane is preferably in the range of from 0.01 to 10 wt. %, more preferably in the range of from 0.05 to 5 wt. %, most preferably from 0.1 to 3 wt. %. Whilst various silanes can be used, the best adhesion performance is achieved when using aminopropyltriethoxysilane (e.g. Dynasylan AMEO from Evonik), aminopropyltrimethoxysilane (e.g. Dynasylan AMMO from Evonik), and phenyltriethoxysilane (e.g. Dynasylan 9265 from Evonik).

ii) The second stage is the incorporation of an athermanous additive preferably from the group of carbon black, graphite, petroleum coke, titanium dioxide, ilmenite, rutile, perovskite mineral, barium sulfate, chamotte, fumed silica, fly ashes, hydromagnesite/huntite mineral or the mixture of all or minimum two additives to the forming geopolymer melt. Mixing is continued, and further geopolymerization takes place, and athermanous additive is encapsulated by geopolymer chains.

The athermanous additive (preferably carbon black, graphite, petroleum coke, titanium dioxide, ilmenite, rutile, perovskite mineral, barium sulfate, chamotte, fumed silica, fly ashes, hydromagnesite/huntite mineral or the mixture of all or minimum two additives) is preferably added in a concentration of from 0.01 to 80 wt. %, more preferably from 0.1 to 50 wt. %, most preferably from 0.5 to 45 wt. % depending on the type of the additive or additive mixture, based on the weight of geopolymer composite. Different mixtures and different ratios between the athermanous additives are possible. After addition of additive or mixture of at least two additives from the above proposed, the thixotropic pulp is further mixed to result in a homogenous consistence. Water can then be added to regulate the final viscosity. The water is added in a preferred ratio from 1/10 to 10/10 or depending on additive type and its bulk density as well as hydrophilic properties.

iii) The filled geopolymer in the form of a thixotropic pulp is removed from the mixer and placed in closed moulds, in which moulds it is then cured, to prevent water evaporation. During this process, the geopolymer polymerization continues. Also, time of geopolymer polymerization is important, thus the curing is preferably continued during a minimum of 6 h and a maximum of 48 h, and most preferable is a curing time of 24 h. After this process, the ready blocks of filled geopolymer contain from 20 to 50 wt. % or more of water, depending on how much excess water was added to regulate the pulp viscosity.

iv) After polycondensation (geopolymerization), the drying of ready blocks of the filled geopolymer is necessary to evaporate any excess of water. When performing the process on a lab scale, a standard cabinet dryer is used. On a the production scale, the ready blocks are stored on racks in a closed hall wherein warm air having a temperature ranging from 40 to 90° C., most preferably from 60 to 80° C., is pumped from the floor ground to the top of the hall and the excess water is removed slowly over 24 h. Normally, from 15 to 25 wt. % of water can be removed from the filled geopolymer blocks during 24 h of drying. The process can be prolonged according to needs and grade of the blocks or water excess, which should be removed before the grinding process.

v) After drying of the blocks, the preliminary milling of these blocks can be optionally performed to form ballast with a particle size of from 1 mm to 50 mm. A larger size is possible if required. Without this process, the blocks can be immediately ground and milled to obtain a fine powder before ion elution and final pulverization drying.

vi) Drying of ballast can optionally be performed in a rotating cylindrical dryer at higher temperature, to remove the remaining excess of water. This drying process is preferably operated at a temperature above 100° C., usually in the range of from 90 to 200° C., preferably from 100 to 170° C. In this process, from 5 to 20 wt. % or more water can be additionally removed from the filled geopolymer depending on the geopolymer composite type.

vii) After drying of the filled geopolymer blocks or drying of ballast, milling is required to obtain the suitable size of particles. The suitable particle size can be obtained by using various types of mills, preferably ball mills, fine impact mills, table roller mills or jet mills; it is preferred that mill should be equipped with a particle size classifier. A preferred particle size is a mean (D50) in a range of from 1 to 8 µm, D90 in a range of from 8 to 15 µm, D99 in a range of from 15 to 20 µm, D100 in a range of from 20 to 30 µm; or the particles can be milled only preliminarily to obtain particles sizes in a range of from 0.01 to 200 µm.

viii) A further (and optional) stage is the elution of sodium, calcium, magnesium or potassium cations from the filled geopolymer, preferably by addition of (concentrated) hydrochloric acid in an aqueous suspension. Other acids may be used, such as sulphuric acid, phosphoric acid or acetic acid. Alternatively, for example magnesium or ammonium cations can replace sodium cations. Filled geopolymer powder (with a mean particle size of from 0.01 to 200 µm) and processing water (demineralised water is optional, but not necessary) in a certain ratio are placed in the reactor vessel (equipped with stirrer, thermocouple and pH meter). Then, concentrated hydrochloric acid is poured into the reactor. The water used in the neutralizing process equals 1.5 to 5.0 mass excess, compared to filled geopolymer powder, and hydrochloric acid used in the process equals 10 to 30 wt. % based on filled geopolymer.

The initial pH is in the range of from 11 to 13, and after acid treatment, the pH decreases immediately below pH 5 and then it is progressively increasing up to pH 6.5. The temperature increases after acid treatment and then it is decreasing gradually. Then, the filled geopolymer is separated from water solution by filtering and preferably again washed in the reactor with demineralised water (1.5 to 5.0 mass excess compared to geopolymer composite powder) and filtered again. The final pH of geopolymer composite and filtrate is in the range of from 7 to 8. Preferably, a filter-press should be used for the filtration. On a smaller scale, the powder can be filtrated from water by using filtration bags.

The sodium elution process may be performed at a higher temperature, e.g. 40-90° C., in order to accelerate cations diffusing from the geopolymer composite. The elution process can be performed at a temperature in a range of from 5 to 100° C., preferably from 20 to 90° C., in particular from 30 to 80° C. when increasing the temperature by 20° C., the elution process can be shortened in time by about 50%, especially when the process temperature is in a range of from 30 to 80° C., in particular 40 to 70° C.

It was surprisingly found that such elution treatment of Geopolymer Composite 1 (see Table 1 in the experimental section) increases its thermal stability according to the TGA measurement (ASTM E1131) and the thermal stability can be further improved by the elution of formed salt from the cavities of geopolymer composite by water (see FIG. 4). The stability, as measured by the end temperature of decomposition, was increased by 150° C.

ix) The drying at the end of step e) is typically performed in a powderdrying equipment, or the pulp can be dried in a fluid bed dryer of suitable construction. The final drying preferably takes place at a higher temperature, above 100° C. (to provide quick evaporation of water, 100 to 250° C. is preferred). The powder after drying is potentially reagglomerated by the pressurized air and again classified to have the same particle size as after the milling in step d). Those agglomerates which could not be destroyed are returned to the milling process.

The particle's shape and size was also proven by an SEM measurement (see FIG. 1).

In a second aspect, the invention relates to II) geopolymer composite comprising geopolymer and athermanous additive.

The athermanous additive is preferably selected from the group consisting of
a. carbon black, petroleum coke, graphitized carbon black, graphite oxides, various types of graphite (especially poor and amorphous forms with a carbon content in a range of from 50 to 90%) and graphene, and
b. titanium oxides, barium sulfate, ilmenite, rutiles, chamotte, fly ash, fumed silica, hydromagnesite/huntite mineral, and mineral having perovskite structure,
preferably the athermanous additive comprises one or more carbon-based athermanous additives selected from the group of heat absorbers and heat reflectors, in particular the athermanous additive component is carbon black, graphite, or a mixture thereof.

Preferably, the geopolymer composite is obtainable and is in particular obtained according to the process for the production of geopolymer composite of the invention, as described above as first aspect of the invention.

Geopolymer composite is preferably prepared from geopolymer, and the amount of athermanous additive is preferably from 0.01 to 80 wt. % by weight calculated on the geopolymer dry mass.

For the geopolymer composite synthesis the following athermanous additives are preferably used:
a) carbonaceous substances such as various grades of carbon black including furnace black, lamp black, channel black, thermal black and acetylene black; various grades of petroleum coke—including needle, regular and sponge coke, calcined petroleum coke; various grades of natural and synthetic graphite.
b) mineral substances, synthetic and natural ones, such as titanium dioxide, rutile, ilmenite, minerals with perovskite structures, kaolin, mica, talc, barium sulfate, tricalcium sulfate, tricalcium phosphate, silica and more possible substances according to WO 2006/058 733 A1, EP 0 863 175, EP 0 981 574, EP 1 758 951, EP 1 771 502 A2, WO 2004/087798 A1, WO 2008/061678 A2, WO 2006/061571 A1, and the other examples mentioned in the present application.

Geopolymer or geopolymer composite may be modified by reaction with coupling agents to obtain better adhesion to the vinyl aromatic expandable polymers. In this case, different coupling agents can be used, depending on where addition takes place during preparation of the geopolymer or the geopolymer composite. However, this depends on the type of geopolymer used and the type of athermanous additive within the geopolymer composite.

Firstly, an adhesion of geopolymer or geopolymer composite to the polymer can be improved by its in situ modification (reaction) with silanes or organometallic titanates, zirconates (such us Ken-React produced by Kenrich Petrochemicals Inc.). The silane or titanate etc. can be added as weight percent per percent of geopolymer solid mass. It can be added in the range of 0.01-10.0 wt. % per 100 wt. % of geopolymer solid mass; in particular 0.1-5.0 wt. %, especially 0.5-3.0 wt. %.

Secondly, the adhesion of geopolymer or geopolymer composite to the vinyl aromatic polymer can be further improved by surface modification with silane or vinyl silane of the ready powder prepared form geopolymer or geopolymer composite. The silane or vinyl silane can be added as weight percent per 100 wt. % of powder. In can be added in the range of 0.01-10.0 wt. % per 100 wt. % of geopolymer solid mass; in particular 0.1-5.0 wt. %, especially 0.5-3.0 wt. %.

In a third aspect, the present invention relates to (III) the use of
a) a geopolymer,
b) a combination of a geopolymer with an athermanous additive, or
c) the geopolymer composite,
for decreasing the thermal conductivity (as measured according to ISO 8301) of foams made from vinyl polymers.

The vinyl polymer may be a non-aromatic vinyl polymer, such as derived from ethylene, propylene, or mixtures thereof. Alternatively, and preferably, the foam is made from vinyl aromatic polymer.

In one embodiment, a), the geopolymer is used.

In a second embodiment, b), a geopolymer is used in combination with an athermanous additive. In this embodiment, the geopolymer and the athermanous additive can be added separately, to result in the filled vinyl polymer foam. Alternatively, geopolymer (powder) and athermanous additive (powder) are first mixed, and are then added as the mixture of geopolymer and athermanous additive, to result in the filled vinyl polymer foam.

In a third embodiment, c), the geopolymer composite as described above is used, i.e. the novel material wherein the athermanous additive is comprised within the geopolymer, and is preferably actually encapsulated by the geopolymer.

In a fourth aspect, the present invention relates to IV) a process for the production of expandable vinyl aromatic polymer in the form of granulate of so-called expandable particles (micro-pellets or beads). There are two embodiments of this process involving the addition of a) a geopolymer, b) a combination of a geopolymer with an athermanous additive, or c) the geopolymer composite, namely (1) an extrusion process (XEPS) and (2) a suspension polymerization process (EPS). In both types of processes, incorporation of a new type of additive (a), b), or c) above) favourably contributes to both the process conditions and the properties of the product.

In the first embodiment of this aspect, the invention relates to an extrusion process for the production of expandable vinyl aromatic polymer granulate, preferably by twin-screw extrusion consisting of a two-step mixing of the athermanous additive and flame retardant in two twin-screw extruders. Mixing takes place in a side twin screw extruder to which the athermanous additive (geopolymer, or combination of geopolymer with athermanous additive or mixture of athermanous additives, or geopolymer composite) is added through the two side feeders, in order to better degas the melt from excess of water and air. In this way, a filler masterbatch is created "in situ" and the filled melt is then (preferably directly, i.e. as melt) transferred to the main 32D twin-screw extruder.

The main extruder is filled with general purpose polystyrene (the same as the one dosed to the side twin screw extruder), polymeric brominated flame retardant, synergist of flame retardant (a type of initiator or peroxide) and nucleating agent (a type of polyethylene wax, or one with 80% crystallinity obtained in a Fischer-Tropsch production process). Then, the melt is impregnated with blowing agent (propellant, typically pentanes, or a suitable mixture). The melt containing all additives is then cooled in a single screw extruder. The melt is then downstream processed in a pressurized underwater pelletization process, to obtain vinyl aromatic polymer granulate. The granulate is finally coated with a mixture of zinc (or magnesium) stearate, glycerine monostearate and glycerine tristearate.

According to the first embodiment of aspect (IV), expandable vinyl aromatic polymer granulate is preferably prepared in an extrusion process comprising the following steps:

i) Feeding of vinyl aromatic polymer or a mixture of different types of vinyl aromatic polymer having different MFI indexes varying in the range of from 4 to 20 g/10 min., as measured according to ISO 1133, into the main co-rotating twin screw extruder together with nucleating agent and flame retardant system in powder or granulate form, comprising at least flame retardant and synergist and optionally thermo-oxidative stabilisers and bromic acid scavengers as thermal stabilizers (including epoxy resins and brominated epoxy resins) as well as hydrotalcite and/or hydromagnesite/huntite like minerals.

The vinyl aromatic polymer, preferably general purpose polystyrene with an average number molecular weight (Mn) of about 60 kg/mol and an Mw/Mn ratio of about 3.4, and an Mz/Mw ratio of about 2 is added to the main hopper of the side twin-screw co-rotating extruder. The vinyl aromatic polymer is in the form of granules and is preferably added as a pre-mixture of flame retardant powder or pellets, synergist and optionally thermo-oxidative stabilizers and bromic acid scavengers and/or brominated epoxy resins as thermal stabilizers for flame retardant; the nucleating agent is also preferably present in the mixture.

The typical flame retardant system preferred in the present invention is based on compounds containing at least 50 wt. % of bromine. Various types of compounds can be used, e.g. aliphatic, cycloaliphatic, aromatic, oligomeric or polymeric compounds. The most preferred flame-retardants are brominated cyclohydrocarbons (e.g. hexabromocyclododecane). A polymeric alternative is a brominated styrene-butadiene rubber. A reduction of the quantity of brominated flame retardant can be achieved by adding brominated (e.g. pentabromomonochlorocyclohexane) or chlorinated hydrocarbons (e.g. chlorinated n-paraffins with chain lengths between 10 and 30 carbon atoms).

The typical compounds which can be used as flame retardant synergist are: a diazo compound, a peroxide or other radical initiator (e.g. dicumyl peroxide, cumene hydroxide or 3,4-dimethyl-3,4-diphenylbutane). The common synergists are compounds that create radicals at temperatures above process temperature but below the temperature of decomposition of the flame retardant.

Preferably, a flame retardant system is present, which is usually a combination of two types of compounds, namely x) a brominated aliphatic, cycloaliphatic, aromatic or polymeric compound containing at least 50 wt. % of bromine, and a second compound (so called synergistic compound, y) which can be bicumyl (i.e. 2,3-dimethyl-2,3-diphenylbutane) or 2-hydroperoxy-2-methylpropane, or dicumyl peroxide, cumene hydroxide, or 3,4-dimethyl-3,4-diphenylbutane.

The total content of flame retardant system, i.e. x) plus y), is typically in a range of from 0.1 to 5.0 wt. % with respect to the total weight of vinyl aromatic polymer, preferably between 0.2 and 3 wt. %. The weight-to-weight ratio of bromine compound x) to synergistic compound y) is preferably in a range of from 1:1 to 15:1, usually in a range of from 3:1 to 10:1, in particular from 2:1 to 7:1.

Thermo-oxidative stabilizers are optional and are added in a concentration ranging from 0.01 to 1.0 wt. %, per weight of polymer. The epoxy resin or brominated epoxy resin, especially F-2200 HM product form ICL company with formula $C_{21}H_{20}Br_4O_4$ containing 48% of bromine, can be added, in a concentration of from 0.01 to 5 wt. %, per weight of polymer, depending on the required effect of thermal stabilization.

Nucleating agent is added in an amount ranging from 0.01 to 1.0 wt. %, preferably from 0.1 to 0.5 wt. %, per weight of polymer. As nucleating agents, polyethylene oligomers or its copolymers with propylene oxide (content in the chain from 10-50%) with a relatively low polydispersity (Mw/Mn) ranging from 1 to 2 and a high crystallinity (above 60%) are used; more preferably Fischer Tropsch polyethylene oligomers with a crystallinity of about 80% can be used.

The processing temperature set-up for a 32D/40 mm extruder is from 100 to 250° C., preferably from 150 to 230° C., more preferably for 170 to 200° C. A suitable processing pressure is in the range of from 30 to 100 bar, more preferably in the range of from 50 to 90 bar.

Dispersion of flame retardant can be further improved by the incorporation of dispersion aids, in particularly copolymers of styrene and maleic anhydride (with a maleic anhydride content in the copolymer in a range of from 5 to 50%, preferably 10 to 30%, more preferably from 10 to 20%), or BYK dispersive agents (in the same concentration ranges).

ii) Feeding of vinyl aromatic polymer into the side arm co-rotating twin-screw extruder together with the powder form of geopolymer or geopolymer composite. The polymer can be a vinyl aromatic homopolymer or preferably copolymer with p-tert butyl styrene or alpha-methyl styrene, having a melt index ranging from 4 to 30 g/10 min, as measured according to ISO 1133. Pure geopolymer can be used, preferably as powder mixture with pure carbon black. Preferably, the concentration of carbon black is from 0.01 to 12 wt. % of maximum and the geopolymer concentration can vary in the range from 0.01 to 50 wt. %, preferably from 0.1 to 30 wt. %, and more preferably from 0.5 to 25 wt. %, based on total weight of polymer, excluding blowing agent. The geopolymer composite based on one from the proposed athermanous additives (including carbon black, graphite, barium sulfate, petroleum coke, titanium dioxide, ilmenite, rutile, perovskite mineral, chamotte, fumed silica, fly ashes, hydromagnesite/huntite mineral or others mentioned) is added alone using one or two side feeder.

The geopolymer composite is typically added in a concentration ranging from 0.01 to 50 wt. % per total weight of polymer (excluding blowing agent), in particular from 0.1 to 30 wt. %, especially from 0.5 to 25 wt. %.

For the in situ compounding of i) geopolymer powder or ii) geopolymer powder with addition of athermanous additive, or iii) geopolymer composite (including one of the proposed athermanous additives (e.g. carbon black, graphite, petroleum coke, titanium dioxide, barium sulfate, ilmenite, rutile, perovskite mineral, chamotte, fly ashes, or hydro-magnesite/huntite mineral)), a D54/25 mm twin-screw extruder is typically used, with a screw design suitable to provide high shearing force and good wetting of additive particles by the polymer. Melt pressures of typically 5 to 80 bar, preferably from 7 to 50 bar, and more preferably from 10 to 40 bar, are preferred to achieve a good dispersion of additive in the final material. For this purpose, it is preferable to use a long twin-screw co-rotating design such as even 55D or longer, to obtain a more homogeneous dispersion of filler in the polymer. Preferably, and to improve dispersion, 2 and more preferably 4 kneading elements, separated by melt back elements, should be used after the feeding section for the powder, to better coat athermanous additive particles by the polymer. The concentration of the geopolymer, or its mixture with athermanous additive, or geopolymer composite, in the melt transported from the side twin-screw extruder, can be in the range of from 10 to 55 wt. % calculated per mass of the polymer dosed to the side twin extruder.

The masterbatch melt is then pumped to the main 32D/40 mm twin screw co-rotating extruder and finally both melts, from the side extruder and from the main twin screw extruder, are mixed immediately at the extruder 3/4 length of the 32D extruder. Different xD lengths are possible depending on the scale, capacity of the production, and different screw diameters.

The processing temperature set-up in the side arm twin-screw extruder is preferably in a range of from 100 to 250° C., more preferably from 150 to 230° C., most preferably from 160 to 210° C. In the compounding process, an amount of heat is generated by shearing and can increase the melt temperature in the required processing zone by about 10° C. to 70° C. The preferred processing pressures in the side arm twin-screw extruder are preferably in a range of from 1 to 100 bar, more preferably from 5 to 70 bar, in particular from 10 to 50 bar. To create suitable shearing forces, the speed of the side arm twin-screw extruder should be set up at a suitable level, preferably ranging from 100 to 2000 rpm, more preferably from 500 to 1500, in particular from 600 to 1200 rpm.

With the most preferable speed and the same kneading elements configuration, a suitable shear rate is generated, preferably in a range of from $1/5$ $s^{-1}$ to $1/100$ $s^{-1}$, more preferably from $1/10$ to $1/80$ $s^{-1}$, in particular from $1/20$ to $1/60$ $s^{-1}$.

It was observed that the dispersion of athermanous additive in the melt of vinyl aromatic polymer can be further improved by addition of specific silanes, in particular tri-ethoxy-(phenyl)silane.

iii) Then the blowing agent (propellant, typically a mixture of n-pentane and isopentane) is added, immediately after both melts are mixed in the 32D/40 mm main twin-screw extruder. The blowing agent is preferably selected from aliphatic or cyclic hydrocarbons containing from 1 to 6 carbons, and their derivatives. The blowing agent is characterized by a boiling point that is lower than the process temperature. Typically, n-pentane, cyclopentane, i-pentane or their mixtures are used.

Also, halogenated, preferably chlorinated, aliphatic hydrocarbons or alcohols containing from 1 to 3 carbons are commonly used. The blowing agent or agents can also be added after the end of the polymerization.

The concentration of blowing agent (propellant) depends on the type of polymer and concentration of additives. The typical values are from 2.0 wt. % to 9.0 wt. %, based on total mass of the composition (in this instance including propellant).

Generally, a mixture of pentane and isopentane is used, with a weight ratio 85/15, 80/20, 75/25, or 70/30%.

Alternative propellants are for instance n-propane, n-butane, isobutane, neo-pentane, cyclopentane, n-hexane, or cyclohexane, or a halogenated hydrocarbon such as dichlorodifluoromethane or trifluorochloromethane.

iv) The melt is cooled down in a dynamic cooling process, to about 5 to 30° C., and the melt containing all above mentioned additives, in particular vinyl aromatic polymer, flame retardant, synergist and optionally thermo-oxidative stabilizers, brominated epoxy resin, bromic acid scavengers, and a. a geopolymer (only) or b. a combination of geopolymer with athermanous additive (separate addition), or a mixture of geopolymer with an athermanous additive or c. a geopolymer composite based on geopolymer and athermanous additive (typically from the group of carbon black, graphite, petroleum coke, titanium dioxide, ilmenite, rutile, barium sulfate, perovskite mineral, chamotte, fumed silica, fly ashes, hydromagnesite/huntite mineral) is then transported in one screw cooling extruder. During this stage, the further dissolution of pentanes continues to be improved in the static mixer connected after the extruder. The temperature range set-up in the cooling extruder is preferably 140-190° C., preferably 160-185° C., more preferably 165-180° C. The temperature in the static mixer is kept accordingly at the melt temperature in the cooling extruder.

Then the composition is pushed by the melt rotary pump through the screens with size of typically 315 μm and then goes through the closed diverter valve to the die plate with holes of preferably 0.7 mm diameter. A smaller size such as 0.6 mm is possible to install. The preferred pressure in the cooling extruder (30D lengths) is in the range of from 50 to 100 bar, preferably from 60 to 90 bar.

v) Further the melt is downstream processed in a pressurized underwater pelletization process, to obtain rounded granulate (micro-particles) extruded through the die plate, preferably with a size distribution within the range of from 0.8 to 1.6 mm. In this step, the filled polymer is cut by the rotating knives on the surface of the die plate, under the water pressure to cool down the polymer granulate quickly and avoid granulate foaming. Other sizes are possible too, such as 0.5 to 1.3 or 0.3 to 0.8 mm. The water is removed from the particles in a centrifuge. Particles are then pre-screened to avoid any agglomerates in the final material and to guaranty 100% proper fraction (the most preferred one is 0.8-1.6 mm), and the product is then passed on to the coating process.

The speed of the rotating knives is typically from 2000 rpm to 4000 rpm, preferably 2500-3500 rpm, more preferably from 2800-3300 rpm.

The water pressure is preferably in a range of from 7 to 13 bar, preferably 8 to 11 bar, more preferably from 9 to 10 bar.

The centrifuge speed to obtain at most 100 ppm of total moisture of particles should be in the range of 1500-3000 rpm, preferably 2000-2800 rpm.

The processing water temperature is in the range of 40–80° C., preferably of 50-70° C., more preferably of 60-70° C. The die plate temperature is in the range from 150 to 270° C., preferably of 200-240° C., more preferably of 205-235° C.

vi) Finally, the material is coated with a mixture of magnesium (or zinc) stearate, glycerine monostearate and glycerine tristearate. The fine powder is dosed to the spade mixer by the gravimetric system together with expandable vinyl aromatic polymer particles. Then the particles are coated over several minutes and the material is unloaded from the mixer to the octabin, filled with a pentane barrier bag.

Generally, the total amount of coating can be from 0.2 to 0.6 wt. %, preferably from 0.3 to 0.5 wt. %, based on polymer granulate weight (inclusive of all additives, and inclusive of propellant), depending on the particles in the produced fraction. Generally, the 99.9% is the required fraction, for example 0.8 to 1.6 mm.

In an alternative twin-screw extrusion process, the additive, i.e. (i) geopolymer, or (ii) combination of geopolymer with athermanous additive, or (ii) geopolymer composite, can be added to the main extruder in the form of a concentrated masterbatch. The masterbatch is prepared in the same side twin-screw co-rotating extruder with 54D length but separately and then incorporated to the main 32D length extruder together with flame retardant. In this alternative, the process does not require a side twin-screw extruder to prepare compounding in situ.

In the second embodiment of the fourth aspect of the invention, expandable vinyl aromatic polymer is prepared in a suspension polymerization process.

In the first step of a preferred suspension process, radically initiated copolymerization preferably takes place in the presence of powder of a. geopolymer, or b. combination of geopolymer with athermanous additive, or c. geopolymer composite, each preferably hydrophobized on the surface by the coupling agents, in particularly by vinyl silanes. In the next step, mixing of prepolymer as obtained in first step with vinyl aromatic polymer takes place, preferably in a twin-screw co-rotating extruder. Underwater pelletization gives a masterbatch in the form of granulate. Then, this masterbatch is preferably, dissolved in styrene, together with flame retardant and nucleating agent. Water is then added, followed by peroxide and surfactants. The polymerization is continued at a temperature in a range of from 75 to 130° C. Next, the resultant polymer is centrifuged to remove the water from the polymer particles (granulate), the particles are dried and are finally coated with a mixture of magnesium (or zinc) stearate and/or mono- and/or di- and/or tristearate of glycerine.

The process preferably comprises the following steps, as described in more detail below:

i) In the first step, the a. geopolymer, or b. combination of geopolymer with athermanous additive (preferably from the group of carbon black, petroleum coke, graphite, titanium dioxide, barium sulfate, ilmenite, rutile, perovskite mineral, chamotte, fumed silica, fly ashes, hydromagnesite/huntite mineral), or c. geopolymer composite, all preferably hydrophobized on the surface by the coupling agents (in particular by vinyl silane such us vinyltriethoxysilane or methacryloxypropyltrimethoxysilane) are radically copolymerized with vinyl aromatic monomer with the following copolymerization parameters: parameter "Q" in a range of from 0.01 to 1 and parameter "e" in a range of from −0.1 to −0.9.

The vinyl aromatic monomer is in particular styrene. Suitable comonomers may be styrene derivatives such as para-methyl styrene and its dimers, vinyl toluene, tertiary-butyl styrene or divinylbenzene.

The process is preferably carried out in a closed reactor under a low nitrogen pressure in a range of from 0.1 to 2 bar. Polymerization (copolymerization) takes place in the molten state, to a vinyl monomer and/or comonomer conversion from 40 to 90%, especially from 50 to 80%. The melt is concentrated and can contain from 10 to 50 wt. % of a. geopolymer or b. combination of geopolymer with athermanous additive (preferably carbon black) in a ratio from 1/99 to 99/1, in particular from 10/90 to 90/10, and especially from 20/80 to 80/20, or c. geopolymer composite.

The prepolymer preferably has a number average molecular weight of 0.50 to 50 kg/mol.

The process temperature is preferably in a range of from 50 to 130° C., more preferably from 70 to 120° C., most preferably from 80 to 100° C. The mixing speed must be optimum and the best agitator is one that can handle highly viscous liquids. The comonomer conversion is measured by a refractometer about every 5 or 10 min. to adjust the suitable time of monomer polymerization.

The concentration of a. geopolymer, or b. combination of geopolymer with athermanous additive (preferably from the group of carbon black, petroleum coke, graphite, titanium dioxide, barium sulfate, ilmenite, rutile, perovskite mineral, chamotte, fumed silica, fly ashes, hydromagnesite/huntite mineral), or c. geopolymer composite is preferably in a range of from 10 to 50 wt. %, more preferably in the range of 15 to 40 wt. %, based on total weight of prepolymer.

ii) In the next step, the prepolymer containing additive (a., b., and/or c.) is transferred to the extruder in the molten state preferably in powder form (first removed from reactor, cooled down, ground and milled). The prepolymer is dosed to the extruder and mixed with vinyl aromatic polymer, in a twin-screw co-rotating extruder with a length 54 or 55D.

In this process, the vinyl aromatic polymer is fed to the extruder in the granulate form, but can be also pumped in the molten state from the continuous mass polymerization plant. The melt is then dosed to the first zone of the extruder. The granules of high molecular weight vinyl aromatic polymer are fed to the main hopper, located before the first zone.

The prepolymer in powder form is preferably fed by the twin-screw co-rotating side feeder to the extruder attached to the second or third zone. The prepolymer in the molten state is fed to the third or the fourth zone. The twin-screw co-rotating extruder typically has 12 zones and 54D length. The concentration of the athermanous additive added into the prepolymer is diluted, depending on the added amount of high molecular weight vinyl aromatic polymer. It can be preferably diluted to a concentration ranging from 5 to 35 wt. %. According to the present invention, it is possible to increase the concentration of athermanous additive in the extruded melt by incorporation of the proper portion of needed athermanous additive in the powder form to the extruder. The powder can be dosed to the main hopper by preliminarily mixing it with granules of high molecular weight vinyl aromatic polymer. The powder of athermanous additive can be dosed by twin-screw side feeders. Then the concentration can be increased to 60 wt. %, preferably to 50 wt. %, more preferably to 40 wt. %, calculated per total mass of masterbatch.

In the extruder, further polymerization takes place, with residual monomer and/or comonomer grafting to the partially copolymerized athermanous additives. Then the athermanous additives are well wetted by the growing polymer chains at the higher temperature, and the shear forces provide for very good athermanous additive dispersion. The same or similar parameters as used in side extrusion process described above can be used to obtain well-reacted and dispersed athermanous additives in the vinyl aromatic polymer by the suspension process.

Granulate is then prepared by underwater pelletization at normal water pressure and water temperature of about 40 to 70° C.

iii) The next step is preferably organic phase preparation by dissolution of prepared masterbatch, containing dispersed a. geopolymer, or b. combination of geopolymer with athermanous additive (preferably from the group of carbon black, petroleum coke, graphite, titanium dioxide, barium sulfate, ilmenite, rutile, perovskite mineral, chamotte, fumed silica, fly ashes, hydromagnesite/huntite mineral), or c. geopolymer composite, or a mixture of any of a. to c., in styrene monomer and/or its comonomer derivatives, together with the flame retardant, nucleating agent and one of peroxides, especially dicumyl peroxide. Dissolution takes place over 10 to 60 min, preferably 30 min, at a temperature starting from 20° C. up to 70° C., and then dissolution is continued with rising temperature to the polymerization temperature, which is preferably 78 to 85° C., especially 79 to 83° C. The step is typically carried out in a 20 l reactor with 4 blade turbine agitator. All following steps were continued in the same reactor vessel.

iv) The next step is the addition of demineralized water, peroxides and surfactants and carrying-out of the first polymerization step at low temperature, especially 79 to 83° C. The preferred ratio of water to organic phase is 1:1. The peroxides are typically t-butyl 2-ethylperoxyhexanoate (Peroxan PO from Pergan) and t-butylperoxy-(2-ethylhexyl) carbonate (TBPEHC from United Initiators). Benzoyl peroxide (BPO) can be used instead of Peroxan PO. The peroxides are immediately added after the dosing of water is finished. The polymerization in continued over 60-180 min, preferably 120 min, and then the temperature is increased, over a minimum of 15 min and a maximum of 60 min, to 88-92° C., preferably about 90° C. At about 90° C., polymerization is continued to the moment of particle identity point of suspension, usually about 120 min, measured from achieved polymerization temperature.

The following surfactant system may be used to stabilize the organic phase at low temperature polymerization profile 82-90° C.:

Potassium persulfate—added in the range 0.00001-1.0% per total weight of organic phase, preferably 0.00005-0.5%. It increases stability of suspension.

Poval 205 (polyvinyl alcohol with 86.5-89 mol % of hydrolysis degree and viscosity 4.6-5.4 mPa·s)—added in the range from 0.01 to 1.0% per total weight of organic phase. Poval 205 contributes to the particles' shape.

Poval 217 (polyvinyl alcohol with 87-89 mol % of hydrolysis degree and viscosity 20.5-24.5 mPa·s)—added in an amount in the range of from 0.01 to 1.0% per total weight of organic phase.

Poval 224 (polyvinyl alcohol with 87-89 mol % of hydrolysis degree and viscosity 40-48 mPa·s) can be used instead of Poval 217. Poval 217 and 224 act as suspension stabilizers.

Arbocel CE 2910 HE 50 LV—hydroxypropyl methyl cellulose, added in an amount in the range of from 0.01 to 1.0% per total weight of organic phase. Regulates suspension stability and acts as protective colloid.

DCloud 45 (polyvinyl alcohol with 47.3 mol % of hydrolysis degree)—added in an amount in the range of from 0.01 to 1.0% per total weight of organic phase. Regulates particles shape.

Alternatively the Pickering stabilization system can be utilized:

Tricalcium phosphate—0.4% for example per total weight of organic phase (used as suspending agent), a typical content range is 0.01-1.0%.

Potassium persulfate—0.0001% for example per total weight of organic phase (used as suspension stabilizer), a typical content range is 0.00001-0.1%.

Additionally, a salt, such as sodium acetate in an amount ranging from 0.01 to 3 wt. % per water phase, preferably from 0.05 to 1.5 wt. %, most preferably from 0.1 to 1 wt. %, or sodium chloride in an amount ranging from 0.01 to 3 wt. % per water phase, preferably from 0.1 to 2 wt. %, most preferably from 0.5 to 1.5 wt. %, can be added to reduce the internal water content in the polymer. Reduction of internal water is important for structure formation during the foaming process. Less water provides for the formation of a more uniform structure.

v) Further, blowing agent is added over from 30 to 120 min, preferably over about 60 min. A mix of isopentane 20% and n-pentane 80% was used.

vi) Polymerization is then continued at a high temperature of 105-130° C., preferably up to 125° C., more preferably about 120° C., over a minimum of 60 min and maximum of 240 min, depending on the process temperature. Before polymerization is started, a portion of surfactant is added, preferably Poval 217 or Poval 224 can be used, in a concentration of from 0.01 to 0.2 wt. %, preferably from 0.5 to 0.1 wt. %. Alternatively, naphthalene-2-sulfonic acid sodium salt (Spolostan 4P) in a concentration of 0.01 to 0.1 wt. % can be used with tricalcium phosphate. Optionally, instead of potassium persulfate, the sodium salt of p-styrene sulfonic acid can be used in a similar concentration. Other inorganic sodium salts—used as anionic surface active agents (known as Pickering emulsifiers) as described in WO 2008/061678 can be added alternatively.

viii) After the polymerization is finished, the slurry is cooled down to 35° C. and the rounded expandable vinyl aromatic particles containing the additive, in particular a. geopolymer, or b. combination of geopolymer with athermanous additive (preferably from the group of carbon black, petroleum coke, graphite, titanium dioxide, ilmenite, barium sulfate, rutile, perovskite mineral, chamotte, fumed silica, fly ashes, hydromagnesite/huntite mineral), or c. geopolymer composite, or the mixture of all, is centrifuged from the slurry and the water is removed. The polymer particles can be washed during the centrifuging process using non-ionic surface-active agents, to avoid any electrostatic charge during drying and transportation of the granulate.

ix) After the centrifuging process, the granulate is dried with warm air (temperature of 35-50° C.) on a moving fluid bed. A standard fluid bed drier may be used. The final moisture content is preferably from 0.1 to 1%, more preferably of 0.2-0.5%, most preferably of about 0.3%, based on the weight of polymer including solid and, if any, liquid additives, but exclusive of propellant.

x) Finally, the material is coated with a mixture of magnesium (or zinc) stearate, glycerine monostearate and glycerine tristearate. The fine powder is dosed to the spade mixer by the gravimetric system together with expandable vinyl aromatic polymer particles. Then the particles are coated over several min and the material is unloaded from the mixer to the octabin filled with a pentane barrier bag. The total amount of coating can be from 0.2 to 0.6 wt. %, preferably 0.3 to 0.5 wt. %, based on the weight of polymer depending on the particle size fraction.

In a fifth aspect, the present invention relates expandable vinyl aromatic polymer granulate comprising vinyl aromatic polymer, one or more propellants, and a. a geopolymer;
b. a combination of a geopolymer with an athermanous additive; or
c. the geopolymer composite.

Preferably, the granulate is obtainable according to the process of the fourth aspect of the invention.

Further preferred is expandable vinyl aromatic polymer granulate, and an expanded foam products made thereof, which comprises vinyl aromatic polymer prepared from styrene monomer with optional incorporation of one or more vinyl comonomers, and a) 0.01-50 wt. % (by polymer weight, including solid and, if any, liquid additives, but exclusive of propellant) of geopolymer in powder form, with a mean particle size from 0.01 µm to 200 µm, measured using a Malvern Mastersizer apparatus according to ISO 13320-1, and a BET surface in the range from 0.01 to 10000 m$^2$/g, measured using a Gemini 2360 surface area analyzer from Micromeritics according to ISO 9277:2010, b) 0.01-50 wt. % (by polymer weight, including solid and, if any, liquid additives, but exclusive of propellant) of a combination of geopolymer with carbon blacks or mixture of at least two types of carbon blacks. The ratio of geopolymer to carbon black or mixtures of at least two carbon blacks is typically in a range of from 1/100 to 100/1. The weight ratio of first carbon black to the second, third or fourth carbon black is typically in the range of from 1/100 to 100/1; with the same ratio a mixture of second to third or third to fourth carbon black is possible. A maximum of 10 different carbon blacks could be used, in a respective ratio in the range of from 1/100 to 100/1, and/or c) 0.01-50 wt. % (by polymer weight, including solid and, if any, liquid additives, but exclusive of propellant) of geopolymer composite in powder form, with a mean particle size in a range of from 0.01 µm to 200 µm, measured using a Malvern Mastersizer apparatus according to ISO 13320-1, and a BET surface in a range of from 0.01 to 10,000 m$^2$/g, measured using a Gemini 2360 surface area analyzer from Micromeritics according to ISO 9277:2010.

Expandable vinyl aromatic polymer granulate may be expanded to form foam with a uniform structure independently from the geopolymer or geopolymer composite concentration in the foam. A uniform structure is characterized by the cell size distribution, as measured by a statistical analysis of the picture prepared by an optical microscopy measurement. From the cross section of the foamed bead, the cell size distribution is determined. The specific structure is created by the addition of geopolymer or geopolymer composite and produces a foam cell size in a range of from 10-100 µm, and the content of cells with a size of 50 µm is more than 30%, 60 µm more than 25%; preferably they have a cell size in the range of from 30 to 80 µm and a content of cells with a size of 50 µm above 35%, 60 µm above 30%; more preferably with a cell size in the range from 40 to 70 µm and a content of cells with a size of 50 µm above 45%, 60 µm is above 40%. In all cases, the content of cells with a size of 40 µm is approximately between 10 and 20% and with a size of 70 µm is approximately between 5 and 20%. The typical structures (with histograms made for expanded vinyl aromatic polymer) as obtained with addition of pure geopolymer and a geopolymer composite are presented in FIG. 2.

Preferably, and according to the fifth aspect, the invention relates to the expandable vinyl aromatic polymer granulate (particles) as obtainable according to the fourth aspect, preferably in an extrusion or a suspension processes.

The expandable vinyl aromatic polymer granulate comprises polymer, one or more propellants and additive which is a. geopolymer, or b. a combination of a geopolymer with an athermanous additive, but is preferably c. the geopolymer composite as prepared from geopolymer and suitable athermanous additive such as those from the group of carbon based athermanous additives (e.g. carbon black or petroleum coke), with optional addition of geopolymeric binders and minerals (e.g. fire clays such as chamotte, kaolinite, and as minerals the titanium ores including ilmenite, rutile, and as well titanium dioxide and synthetic rutile, and optionally barium sulphate). The binders and/or minerals and/or carbon-based athermanous additives can be used alone in the b. combination of geopolymer or be used separately according to the desired properties of geopolymer composite and final (foamed) product.

Additionally, the granulate or foam may contain: brominated flame retardant, preferably an environmentally friendly polymeric brominated flame retardant (Emerald 3000 from Chemtura, FR-122P from ICL or GREENCREST from Albemarle); synergist from the group of initiators or peroxides with relatively high temperature of decomposition; nucleating agent with high degree or crystallinity, preferably polyethylene oligomers from the group of Polywax (Baker Hughes) or Fischer Tropsch waxes from Evonik for example; blowing agent from the group of low boiling hydrocarbons, such as pentane or its suitable mixtures with isopentane.

The vinyl aromatic polymer used in all aspects of the invention is in particular polystyrene or a vinyl aromatic styrene copolymer. In the copolymer, a part of styrene monomer is substituted with unsaturated comonomer, the reactivity of which is close to styrene monomer's reactivity, such as p-methyl styrene and its dimers, vinyl toluene, t-butyl styrene or divinylbenzene. For the extrusion process and suspension process, typically used vinyl aromatic polymers have a different number average molecular weight.

In the extrusion process, it is preferred to use a general purpose type of polystyrene (or a copolymer with unsaturated styrene derivative) with a number average molecular weight (Mn) of from 40 to 100 kg/mol, preferably of from 50 to 80 kg/mol, more preferably of from 55 to 70 kg/mol, and a suitable polydispersity of Mw/Mn in a range of from 2.0 to 5.0, preferably of from 2.5 to 4.0, more preferably of from 3.0 to 3.5, and Mz/Mw in the range of from 1.5 to 2.5.

The vinyl aromatic polymer as produced in the suspension process preferably has a number average molecular weight (Mn) from 50 to 120 kg/mol, preferably of from 60 to 100 kg/mol, more preferably of from 70 to 90 kg/mol, and a suitable polydispersity Mw/Mz in a range of from 2.0 to 4.5, preferably from 2.5 to 4.0, more preferably from 3.0 to 4.0, and Mz/Mw in the range of from 1.5 to 2.5.

Flame Retardant and Flame Retardant System

Typically, a flame retardant is used according to all aspects of the invention, to make expanded vinyl aromatic polymers which are self-extinguishing. The flame retardant is usually a combination of two types of compounds, namely a brominated aliphatic, cycloaliphatic, aromatic or polymeric compound containing at least 50 wt. % of bromine, and a second compound (so called synergistic compound) which can be bicumyl (i.e. 2,3-dimethyl-2,3-diphenylbutane) and/or its polymeric form, or 2-hydroperoxy-2-methylpropane.

Optionally, the flame retardant can be stabilized by addition of thermo-oxidative stabilizers, especially standard components (e.g. Irganox 1010 in synergistic mixture with Irgafos 126), in which the components are used in a ratio of 1/2, preferably 1/1. The bromic acid scavenger used can be an epoxy resin, e.g. a solid multifunctional epichlorohydrin/cresol novolak epoxy resin, for example Epon 164 with an epoxy equivalent weight of 200 to 240 g/eq. The resin is typically used in a ratio of 2/1 with Irganox 1010 and Irgafos 126.

Other acid scavengers that can be used are special grades of hydrotalcite such as DHT-4A from Kisuma Chemicals and hydromagnesite/huntite mineral, a hydrated magnesium carbonate mixed with platy magnesium calcium carbonate (such as UltraCarb 1250 from Minelco). Additionally, hydromagnesite/huntite can act as halogen free flame retardant and smoke suppressant and can thus in combination with brominated flame retardant strengthen the self-extinguishing effect. A beneficial influence of this mineral in the reduction of thermal conductivity was also noticed.

Geopolymer Composite

The geopolymer composite used in accordance with the invention is preferably synthesized from metakaolin (geopolymeric binder based on fire clays—metaclay) and sodium or potassium polysilicate solution, preferably a sodium solution may be used, and/or carbon blacks and/or petroleum cokes and/or graphite and/or chamotte and other crystalline fire clays as cross linking precursors and/or titanium dioxide, and/or barium sulfate and/or synthetic rutile and/or ilmenite and/or perovskite and/or fumed silica and/or fly ashes and/or hydromagnesite/huntite mineral can be used as well.

The geopolymer composite can e.g. contain up to 70% of athermanous additive from the group of carbon-based additives, such as carbon blacks and/or petroleum cokes and/or graphite. Various types of carbon black and petroleum coke and graphite can be added. In addition, it is possible to incorporate graphitized carbon black together with synthetic or natural graphite or alone. The concentration of athermanous additives in the geopolymer composite depends on the geopolymer composite's viscosity, and this is related to the athermanous additive's particle size and BET surface area of the particular additive.

The geopolymer composite powder is preferably characterized by the following parameters:
- a mean particle size, as measured by laser diffraction, specifically using a Malvern Mastersizer apparatus according to the standard ISO 13320-1. The mean particle size should be in the range of from 0.01 to 200 µm, preferably of from 0.1 to 50 µm, more preferably of from 0.5 to 30 µm, and especially of from 1 to 25 µm.
- a BET surface in the range from 0.01 to 10,000 m²/g, as measured by a Gemini 2360 surface area analyzer from Micromeritics, according to ISO 9277:2010.
- a moisture content in the range of from 0.1 to 10% per total mass of geopolymer composite.

Kaolinite and Metakaolin

Kaolinite used according to the present invention is a clay mineral composed of aluminosilicate oxides with the formula $Al_2O_3.2SiO_2.2H_2O$. It is a layered silicate mineral, with one tetrahedral sheet linked through oxygen atoms to one octahedral sheet of alumina octahedral.

Endothermic dehydration of kaolinite begins at 550-600° C., producing disordered metakaolin, but continuous hydroxyl loss is observed up to 900° C.

The calcination of kaolin clay at 550-900° C., preferably 600-800° C. and more, more preferably 600-700° C., results in metakaolin that is preferably used according to the invention.

The metakaolin used according to the invention is preferably composed of:
- aluminium oxide in an amount in the range of 25-50 wt. %, preferably 30-45 wt. % and more preferably 33-43 wt. %.
- silicon dioxide in an amount in the range of 35-70 wt. %, preferably 50-65 wt. % and more preferably 55-60 wt. %.

Titanium Dioxide

Titanium dioxide occurs in form of three common crystalline phases, namely rutile, anatase and brookite. Rutile is the most stable form, while anatase and brookite slowly convert to rutile upon heating above 550° C. and 570° C. All three forms of titanium dioxide have six co-ordinated titanium atoms in their unit cells. Rutile and anatase structures are tetragonal. Titanium dioxide is characterized by its excellent processing properties, ease of wetting and dispersion. Moreover, it is able to absorb infrared radiation, thus in this manner was used in the synthesis of geopolymer composite of the invention, to decrease thermal conductivity of the expanded vinyl aromatic polymer (as measured according to ISO 8301).

The titanium dioxide preferably used in the present invention has a $TiO_2$ content in the range of 70.0-99.9 wt. %, as measured according to standard PT-5006, preferably 85.0-99.0 wt. %, more preferably from 90-98 wt. %. The total $Al_2O_3$ and $SiO_2$ content is in the range of 0.1 to 30 wt. %, preferably in the range of from 1 to 10 wt. %, more preferably of from 3-5 wt. %, as measured according to PT-5003 and PT-5002 standards. The density is preferably 1 to 7 kg/dm³, as measured according to DIN ISO 787 standard, preferably 2 to 6 kg/dm³, more preferably 3 to 5 kg/dm³. The average particle size is in the range of 0.01 to 100 µm, preferably in the range of 0.1 to 30 µm, more preferably 0.5 to 25 µm, as measured by a Malvern Mastersizer apparatus according to the standard ISO 13320-1.

Ilmenite

Ilmenite is a titanium-iron oxide mineral ($FeTiO_3$), weakly magnetic, considered as the most important ore of titanium. Ilmenite most often contains appreciable quantities of magnesium and manganese and the full chemical formula can be expressed as $(Fe, Mg, Mn, Ti)O_3$. Ilmenite crystallizes in the trigonal system. The crystal structure consists of an ordered derivative of the corundum structure.

The ilmenite as used according to the invention preferably has a $TiO_2$ content in the range of from 10 to 70 wt. %, preferably of from 30 to 50 wt. %, more preferably of from 40 to 45 wt. %. It is preferred that the total Fe content is from 5 to 50 wt. %, preferably from 20 to 40 wt. %, more preferably from 33 to 38 wt. %. The content of $SiO_2$, MnO, MgO, Cao, $Al_2O_3$ and $V_2O_5$ is in the range of from 0.1 to 20 wt. %, preferably in the range of from 1 to 15 wt. %, more preferably in the range of 5 to 10 wt. %. The density is preferably from 2 to 6 kg/dm³, as measured according to DIN ISO 787, preferably 3 to 5 kg/dm³. The average particle size is in the range of from 0.01 to 100 µm, preferably in the range of from 0.5 to 30 µm, as measured by laser diffraction, using a Malvern Mastersizer apparatus according to ISO 13320-1.

Rutile

Rutile is a mineral composed primarily of titanium dioxide ($TiO_2$). Natural rutile may contain up to 10% of iron and significant amounts of niobium and tantalum. Rutile crystallizes in the tetragonal system.

The titanium dioxide used in the present invention preferably has a $TiO_2$ content in the range of from 70.0 to 99.9 wt. %, preferably of from 85.0 to 99.0 wt. %, more preferably from 90 to 93 wt. %. The $SiO_2$ content is in the range of 0.1 to 10 wt. % preferably in the range from 1 to 5 wt. %, more preferably from 2 to 4 wt. %. The density is from 1 to 7 kg/dm$^3$, as measured according to DIN ISO 787, preferably 2 to 6 kg/dm$^3$, more preferably 3 to 5 kg/dm$^3$. The average particle size is in the range of 0.01 to 100 µm, preferably in the range of 0.1 to 30 µm, more preferable is range of 0.5 to 25 µm, measured by laser diffraction, using a Malvern Mastersizer apparatus according to the ISO 13320-1.

Perovskite

A mineral of the general formula $ABX_3$ is preferably present, A and B being cations and X being anions, wherein the mineral has perovskite crystal structure (in the following "mineral having perovskite structure", or "perovskite"). This type of additive reduces flame development by the creation of char with higher viscosity and thus reduces dripping and flaming.

The perovskite as preferably used in accordance with the invention has the following specific properties:
  a crystalline structure with the general formula $ABX_3$ where A and B are two cations of different sizes and X is an anion that bonds to both, the A atoms are larger than the B atoms, and its ionic radii close to that on the anion X thus they can form together a cubic (orthorhombic) close packing with space group Pm3m. In the structure the B cation is 6-fold coordinated and A cation 12-fold coordinated with the oxygen anions.

The structure of an ideal cubic perovskite structure is shown in FIG. 3, where A cations are shown at the corners of the cube, and the B cation in the centre with oxygen ions in the face-centred positions.

For the stoichiometric oxide perovskite, the sum of oxidation states of A and B cations should be equal to six.

Preferably, A is selected from the group consisting of Ca, Sr, Ba, Bi, Ce, Fe, and mixtures thereof. Moreover, the A atom can be represented also by hybrid organic-inorganic groups, e.g. $(CH_3NH_3)^+$.

The B atom is preferably represented by Ti, Zr, Ni, Al, Ga, In, Bi, Sc, Cr, Pb as well as ammonium groups. The X atom is preferably represented by oxygen or halide ion, or mixtures thereof.

Among the most important representatives of minerals having perovskite structure are dielectric $BaTiO_3$, high-temperature semiconductor $YBa_2Cu_3O_7x$, materials exhibiting magnetoresistance $R_{1-x}A_xMnO_3$, where $R=La^{3+}$, $Pr^{3+}$ or other earth ion, $A=Ca^{2+}$, $Sr^{2+}$, $Ba^{2+}$, $Bi^{2+}$, $Ce^{2+}$, and multiferroic materials.

Perovskites have large reflectance properties in the broad wavelength and a high optical constant, even in the far-infrared region. Hence, perovskites are infrared reflective materials that reflect infrared rays included in sunlight or the like and reduce the level of absorbed infrared rays.

Perovskites according to the invention are preferably characterized by:
  a BET surface size in the range of 0.01 to 100 m$^2$/g as measured according to the ASTM C1069 and ISO 9277 as explained above. The BET active surface area is preferably in the range of 0.05 to 50 m$^2$/g and more preferable in the range of 0.1 to 15 m$^2$/g.
  a particle size in the range of 0.01 to 100 µm as measured according to the standard procedure using a Malvern Mastersizer 2000 apparatus. The particle size is preferably in a range of 0.1 to 30 µm, more preferably in the range of 0.5 to 25 µm.

Sodium Activator (Glass Water) as Preferred Alkaline Silicate

Glass water is a water soluble alkali metal silicate with a certain molar ratio of $M_2O:SiO_2$ (M representing Na or K, or a mixture of Na and K), corresponding to the chemical formula $M_2O:2SiO_2*nH_2O$, n being comprised between 2 and 6. In the present invention, M is in one embodiment preferably Na.

Alternatively, M is K. Although potassium silicate is more expensive than sodium silicate, the properties of the geopolymers prepared with potassium silicate are much better than those obtained with sodium silicate.

In the present invention, the molar ratio of $M_2O:SiO_2$ is preferably comprised between 0.2 and 0.8. In the following examples, the alkali metal silicate solution contains 20 to 30 wt. % by weight of $SiO_2$, 15 to 26 wt. % of $K_2O$ or $Na_2O$, and 45 to 65 wt. % by weight of water. The solution may be prepared in advance or may result from the dissolution of solid (powdered) alkali silicate present in the mix, with added water.

Calcium Silicate as Part of or as the Aluminosilicate Component

Calcium silicates with Ca/Si atomic ratio equal to or greater than 1, such as wollastonite $Ca(SiO_3)$, gehlenite $(2CaO.Al_2O_3.SiO_2)$, akermanite $(2CaO.MgO.2SiO_2)$ are preferred. When the particles of these substances are exposed to an alkaline solution (NaOH or KOH), very rapid desorption of CaO occurs, so that the Ca/Si atomic ratio becomes less than 1 and is closer to 0.5. There is an in situ production of soluble calcium disilicate $Ca(H_3SiO_4)_2$ that contributes to the geopolymeric reaction. Industrial by-products and high-temperature residues contain essentially the basic silicates gehlenite, akermanite and wollastonite, and are thus very suitable. They are found in blast furnace slag.

Under the microscope, the hardened geopolymer examples of cement show that the finer slag grains have disappeared. One only sees an imprint of their initial shape, in the form of a skin probably made up of akermanite, which did not react.

This process is very regular and may be complete within 30 min. However, when the slag has a very fine grain size, such as 400 m$^2$/kg or greater (this corresponds to a mean grain size d50 of 10 µm), the hardening of geopolymer composite is too fast. Now, in the prior art, the blast furnace slag used has a specific surface area in the range of 400 to 600 m$^2$/kg, i.e. d50 less than 10 µm, such as in WO 98/31644.

In the Forss patents, the specific surface area of the slag is greater than 400 m$^2$/kg, preferably comprised between 500 and 800 m$^2$/kg. This is not the case in the present invention where, preferably, 5 to 15 parts by weight of blast furnace slag with a specific surface area less than 380 m$^2$/kg or d50 between 15 and 25 µm are used. This results in mixtures with a pot-life ranging between 1 and 4 hours.

In general, use of calcium silicate improves the geopolymer properties by better dissolution of metakaolinite in the sodium activator.

Carbon Black as Most Preferred Athermanous Additive or Component

The carbon black as most preferably used in geopolymer composite preparation according to the invention has a BET surface, as measured according to ASTM 6556 standard, in the range of 5 to 1000 m$^2$/g. The following carbon blacks within this BET surface area range can be characterized:
  Furnace black, this is the most important carbon black, in which hydrocarbons are partially combusted and immediately quenched with water. The primary particle consists of several graphene like layers, which combine to form oval or spherical particles. The processing conditions influence the particle diameter. Primary particles combine, to form aggregates of different size and structure.

Acetylene black has a special importance in electrochemical applications and is produced by partial oxidation of acetylene gas at high temperature. The acetylene black shows high aggregate structure and crystal orientation.

Pure black, which is furnace black, graphitized in a second step by a continuous graphitization process in a fluidized bed. The graphitization rearranges the graphene layers into a graphitic structure and makes them highly conductive. Moisture pick-up is very limited and solvent absorption is small.

Lamp black is a type of carbon black obtained from the soot of burned fat, oil, tar, or resin. Lamp black is a soft brownish- or bluish-black pigment that is very stable and is unaffected by light, acids and alkalis. This black, amorphous, carbon pigment is produced by the thermal decomposition of 100% natural hydrocarbons. The traditional types of lamp black are the most diverse, because lamp black was produced by collecting soot from oil lamps. The material has irregular needles, crystals, shots, and flakes of 15 to 95 nm.

It is preferred in all aspects of the invention that:

the BET surface of the carbon black is from 5 to 200 $m^2/g$, preferably from 10 to 150 $m^2/g$, in particular from 15 to 100 $m^2/g$, as measured according ISO 9477 standard.

the sulphur content of the carbon black is in the range of from 50 to 20.000 ppm, as measured according to standard ASTM D1619, preferably from 3.000 to 10.000 ppm.

the iodine number of the carbon black is from 10 to 100 mg/g, in particular from 20 to 80 mg/g, especially from 25 to 50 mg/g, as measured according to standard ISO 1304.

the oil number (OAN) of the carbon black is from 50 to 150 cc/100 g, especially 60 to 110 cc/100 g, measured according to ISO 4656.

the moisture content of the carbon black is from 0.2 to 1.5%.

the tinting strength of the carbon black is from 5 to 100%, preferably from 10 to 50% maximum, as measured according to ISO 5435.

Petroleum Cokes

Depending on purity, the conditions in the coker and the subsequent calcinations, a variety of different coke types can be produced. Typical coke products are needle coke, regular coke, and sponge coke. Needle coke consists of highly structured graphene layers. Regular coke consists of irregularly oriented graphene layers. Sponge coke is a coke with highly porous structure. It is preferred according to the present invention to use a coke for the preparation of geopolymer composite having a sulphur content in the range from 1 to 100 000 ppm, preferably 50 to 20 000 ppm, as measured according to ASTM D1619, and an ash content from 0.1 to 1%. In addition, preferably, the mean diameter size of coke particles should be in the range of 0.01 to 100 µm, more preferably in the range of 0.1 to 30 µm, suitably 0.5 to 25 µm.

To obtain favourable properties of geopolymer composite and expanded foam composite, the coke's further properties are preferably:

an iodine number from 10 to 60 mg/g, in particular from 20 to 50 mg/g, especially from 25 to 40 mg/g, as measured according to standard ISO 1304.

an oil number (OAN) from 10 to 150 cc/100 g, especially 20 to 100 cc/100 g, more preferably from 25 to 50 cc/100 g, as measured according to standard ISO 4656.

a moisture content from 0.2 to 1.5%.

a tinting strength from 1 to 100%, preferably from 5 to 50% maximum, as measured according to standard ISO 5435.

Chamotte

The chamotte preferably used according to the invention is preferably composed of:

aluminium oxide in an amount in the range of 25 to 50 wt. %, preferably 30 to 45 wt. % and more preferably 33 to 43 wt. %.

silicon dioxide in an amount in the range of 30 to 65 wt. %, preferably 40 to 60 wt. % and more preferably 50 to 55 wt. %.

iron(III) oxide in an amount in the range of 0.1 to 4.5 wt. %, preferably 0.5 to 4.0 wt. % and more preferably 1 to 3 wt. %.

calcium oxide and magnesium oxide in a total amount in the range of 0.1 to 3 wt. %.

It is preferred that the water absorption of chamotte as used according to the invention is 10 wt. % maximum, preferably lower than 7 wt. % and more preferably lower than 5 wt. %.

Moreover, chamotte used according to the invention preferably has a melting point of approximately 1780° C. Its thermal expansion coefficient is most preferably about 5.2 mm/m, and thermal conductivity (as measured according to ISO 8301) is about 0.8 W/(m·K) at 100° C. and about 1.0 W/(m·K) at 1000° C.

The chamotte used in this invention acts as a cross-linking precursor agent.

Fumed Silica

In the present invention, the term thermal silica fume designates exclusively an amorphous type of silica obtained by condensing of SiO vapours resulting from the very high temperature electrofusion of siliceous materials, generally at about 2000° C.; the said alkaline silicate is preferably obtained by dissolving the said thermal silica in a concentrated solution of NaOH and/or KOH.

In a preferred embodiment of the invention, the thermal silica fume is prepared by electrofusion of zircon sand. The obtained thermal silica fume preferably contains at most 10% by weight of $Al_2O_3$ and at least 90% by weight of $SiO_2$. It has a chemical formula between ($13Si_2O_5$, $Al_2O_2$) and ($16Si_2O_5$, $Al_2O_2$), representing an aluminosilicate oxide with Al in coordination (IV), with additional amorphous silica $SiO_2$. In the following part of this specification, the aluminosilicate oxide having the characteristics of this thermal silica is written as ($15Si_2O_5$, $Al_2O_2$), however, without excluding from the scope of the invention other thermal silica fumes with compositions containing at most 10% by weight of $Al_2O_3$ and at least 90% by weight of $SiO_2$.

The fumed silica used in this invention acts as a cross-linking precursor agent and viscosity modifier.

Huntite and Hydromagnesite

Huntite (magnesium calcium carbonate with the formula $Mg_3Ca(CO_3)_4$) and hydromagnesite (hydrated magnesium carbonate with the formula $Mg_5(CO_3)_4(OH)_2 \cdot 4H_2O$) or their combination in certain ratios are used according to the invention as char promoting fire retardants. Huntite and hydromagnesite in accordance with the invention preferably have the following specific properties:

a bulk density of from 0.24 to 0.36 $kg/m^3$.

a particle size in the range of from 0.01 to 100 µm, as measured according to the standard procedure using a Malvern Mastersizer 2000 apparatus. The particle size is preferably in the range of from 0.1 to 30 μm, more preferably in the range of from 0.5 to 25 μm.

a BET active surface area preferably in the range of from 5 to 30 m²/g and more preferable in the range of from 10 to 20 m²/g.

a char residue, at 1000° C., of over 35 wt. %, preferably over 45 wt. % and more preferable over 50 wt. %.

a specific gravity in the range of from 2.32 to 2.66 g/cm³.

a pH in the range of from 9 to 12.

a hardness according to the Mohs scale of minerals in the range of from 2 to 3.

an oil absorption in the range of from 23 to 39 ml/100 g.

The expandable vinyl aromatic polymer granulate preferably comprises one or more types of geopolymer composite (containing encapsulated or physically or chemically modified athermanous additives selected from the group of carbon black, petroleum coke, graphitized carbon black, graphite oxides, graphite and graphene, titanium oxides, barium sulfate, ilmenite, rutiles, chamotte, fly ash, fumed silica, hydromagnesite/huntite mineral, perovskite mineral).

Preferably, the parameters relating to the a. geopolymer or b. geopolymer with carbon black or c. geopolymer composite, and furthermore the use of vinyl aromatic copolymers with p-tert-butylstyrene as example or other vinyl aromatic comonomer, set out above in relation to the processes of the invention, equally apply to the expandable vinyl aromatic polymer granulate and the other aspects; the same applies for the other constituents, of the geopolymer composite, the granulate, the foam, and the masterbatch.

A process for the production of expanded vinyl aromatic polymer foam preferably comprises the following steps:

i) the first step is preferably preliminary expansion, recognized by the industry as the first step of expansion, to obtain a required density of approx. 17 kg/m³, before the second expansion step to obtain an even lower density, for example approximately 11 or 12 kg/m³. Obviously, the first expansion step can be only used to obtain expanded beads ready for block moulding process. Steam pressures in the range of from 0.02 to 0.22 kPa are used. The steaming time can vary from 30 to 100 seconds.

ii) In the next step, the expanded beads are aged, and this is necessary after the first and as well after the second expansion process. Aging is preceded in the silos made of breathable material. Usually, a minimum of 6 h is necessary to achieve good properties of final material and optimum moulding conditions. Maximum 24 h can be utilized preferably. Aging serves to stabilize the content of blowing agent in the beads by interchange its part by the air. This process also equalizes the pressure of gases in the cells.

iii) In the second step, the block moulding process proceeds and the expanded beads are welded together to form the bead foam block. Depending on the foam density and foam type, the steam pressure varies from 0.4 to 0.9 kPa. With this material, all possible foam densities required for the EPS market can be obtained, from 8 to 30 kg/m³.

iv) Then the moulded blocks are conditioned for several days, to remove the rest of blowing agent and water, and to stabilize their shape. After that time, the blocks can be cut, to the final foam insulation boards.

In a sixth aspect (VI), the invention relates to expanded vinyl polymer foam comprising vinyl polymer and
a. a geopolymer;
b. a combination of a geopolymer with an athermanous additive; or
c. the geopolymer composite.

Preferably, the expanded vinyl polymer foam comprises vinyl aromatic polymer, and the foam is more preferably obtainable by expansion of the granulate according the fifth aspect of the invention.

The foam (made of expanded vinyl aromatic polymer with addition of a. geopolymer, or b. combination of geopolymer with athermanous additive, or c. geopolymer composite) has a density of from 8 to 30 kg/m³, and a thermal conductivity (as measured according to ISO 8301) of from 25 to 35 mW/K·m. Specifically, the foam should have thermal conductivity for low densities in the range of from 31 to 34 mW/m·K at densities of from 8 to 14 kg/m³. For higher densities, thermal conductivity is preferably in the range of from 28 to 31 mW/mK, at densities of from 17 to 21 kg/m³.

In all aspects of the invention, when c. geopolymer composite is present, this does not exclude the presence of athermanous additive that is not contained within the geopolymer composite.

In a seventh aspect (VII), the invention relates to a masterbatch comprising vinyl polymer and a., b. and/or c.

In a first embodiment of the seventh aspect (VII), the invention relates to a masterbatch comprising vinyl polymer and a. geopolymer, wherein the amount of geopolymer is in a range of from 10 to 70 wt. %, based on the weight of the masterbatch. Preferred is a masterbatch wherein the amount is in a range of from 10 to 65 wt. %, based on the weight of the masterbatch, more preferably the amount is in a range of from 20 to 60 wt. %, most preferably the amount is in a range of from 25 to 55 wt. %.

In a second embodiment of the seventh aspect (VII), the invention relates to a masterbatch comprising vinyl polymer and b. a combination of a geopolymer with an athermanous additive, wherein the total amount of geopolymer and athermanous additive is in a range of from 10 to 70 wt. %, based on the weight of the masterbatch. Preferred is a masterbatch wherein the amount is in a range of from 10 to 65 wt. %, based on the weight of the masterbatch, more preferably the amount is in a range of from 20 to 60 wt. %, most preferably the amount is in a range of from 25 to 55 wt. %.

In a third embodiment of the seventh aspect (VII), the invention relates to a masterbatch comprising vinyl polymer and c. a geopolymer composite derived from geopolymer and comprising athermanous additive, wherein the amount of geopolymer composite is in a range of from 10 to 70 wt. %, based on the weight of the masterbatch. Preferred is a masterbatch wherein the amount is in a range of from 10 to 65 wt. %, based on the weight of the masterbatch, more preferably the amount is in a range of from 20 to 60 wt. %, most preferably the amount is in a range of from 25 to 55 wt. %.

Preferred according to all embodiments of the seventh aspect of the invention is a masterbatch wherein the vinyl polymer is a vinyl aromatic polymer, more preferably the vinyl aromatic polymer has a melt index in a range of from 4 to 30 g/10 min, as measured according to ISO 1133, most preferably the vinyl aromatic polymer is a homopolymer or copolymer with p-tert butyl styrene or alpha-methyl styrene.

Also preferred according to all embodiments of the seventh aspect of the invention is that a masterbatch further comprises one or more silanes (preferably selected from aminopropyltriethoxysilane, aminopropyltrimethoxysilane, and phenyltriethoxysilane). Preferably, the amount of silane is in a range of from 0.01 to 1 wt. %, based on the respective weight of a., b. or c. in the masterbatch.

The materials according to the invention (the polymer composition, the granulate, the foam and the masterbatch) may, in addition to
a. a geopolymer;
b. a combination of a geopolymer with an athermanous additive; or
c. the geopolymer composite,
contain further additives, as is set out above.

It is noted that, unlike the properties of the starting materials, the properties of additives as contained in the granulate or foam are notoriously difficult to determine. It is often considered more appropriate to characterize the additives in granulate and foam with reference to the properties of the additives as initially used.

The advantages of the present invention become apparent from the following examples. Unless indicated otherwise, all percentages are given by weight.

Moreover, whenever reference is made in the description to an amount of any additive "by weight of polymer", this refers to the amount of the additive by weight of polymer component inclusive of (solid and, if any, liquid) additives, but exclusive of propellant.

EXAMPLES

Example 1

Figure 1:
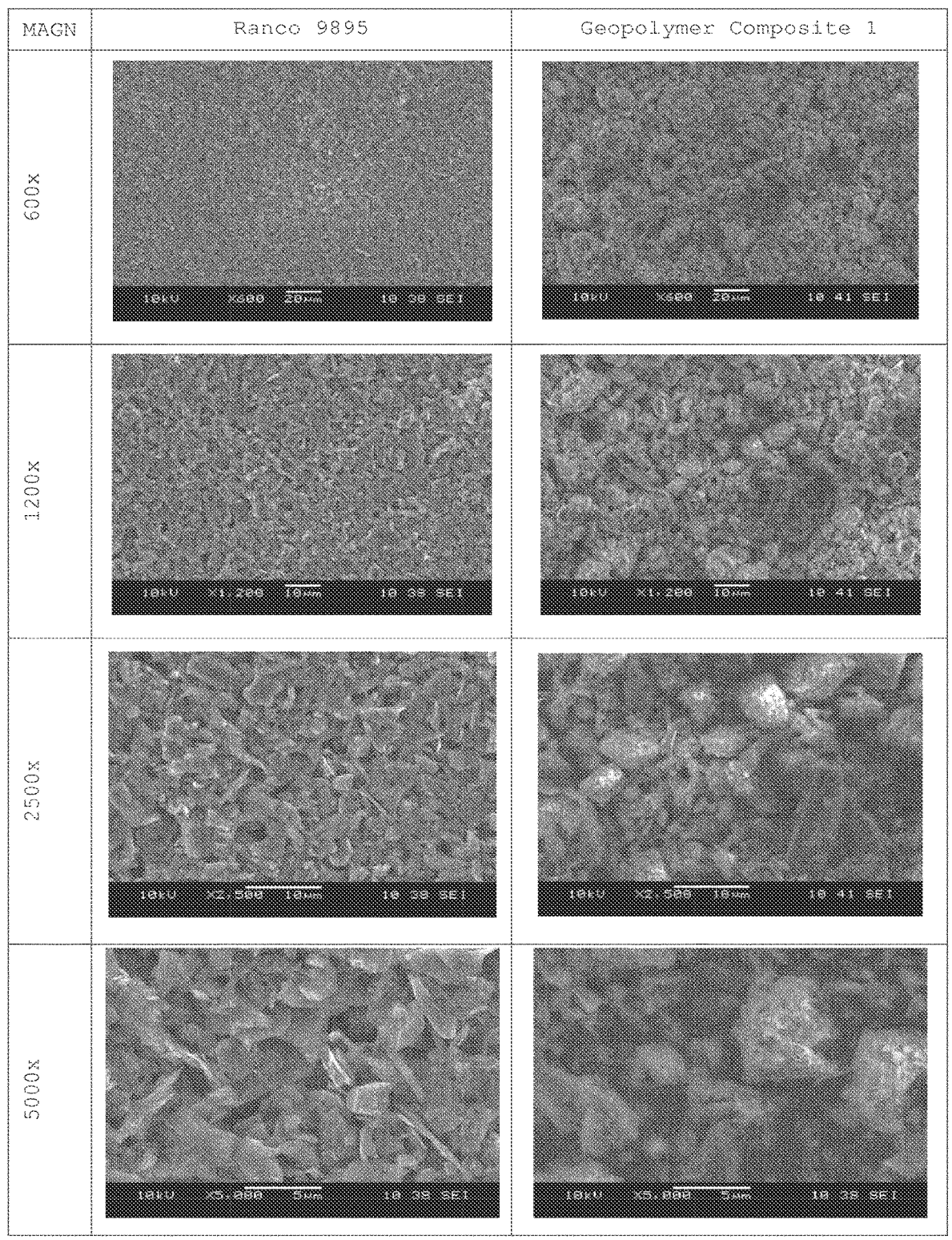
FIG. 1 shows SEM micrographs of Ranco 9895 (left-hand column) and Geopolymer Composite 1 (right-hand column) at different magnifications.
Figure 2:
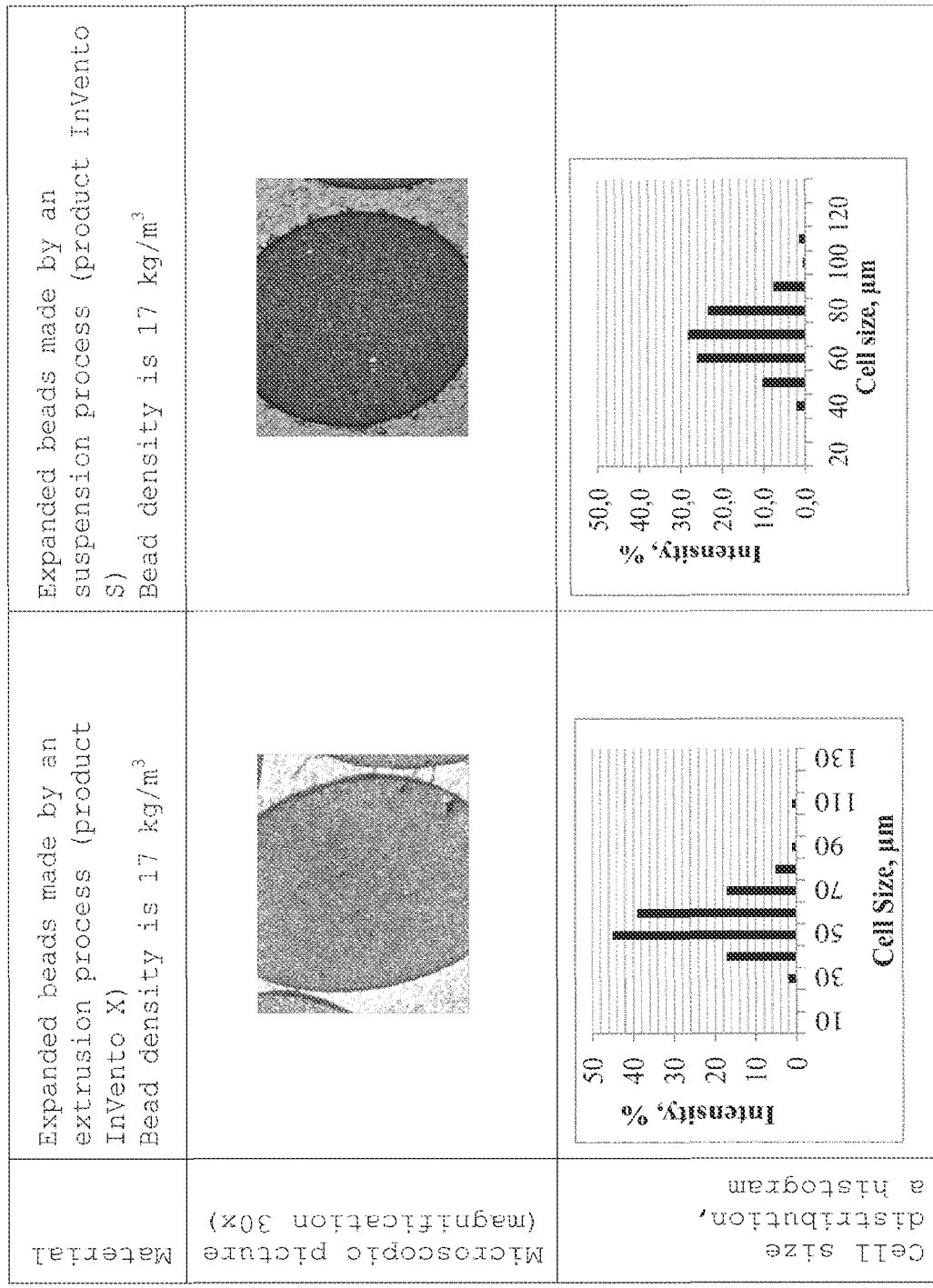
FIG. 2 shows a microscopic picture (at a magnification 30×) and the cell size distribution histograms for expanded beads made by an extrusion process (left-hand column) and by a suspension process (right-hand column).
Figure 3:
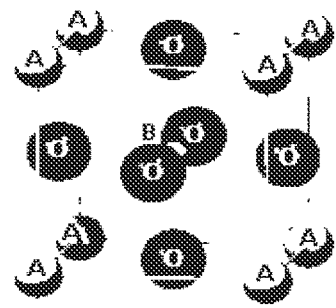
FIG. 3 shows the structure of an ideal cubic perovskite ($ABO_3$), where A and B represent cations and O represents oxygen anions forming an octahedron.
Figure 4:
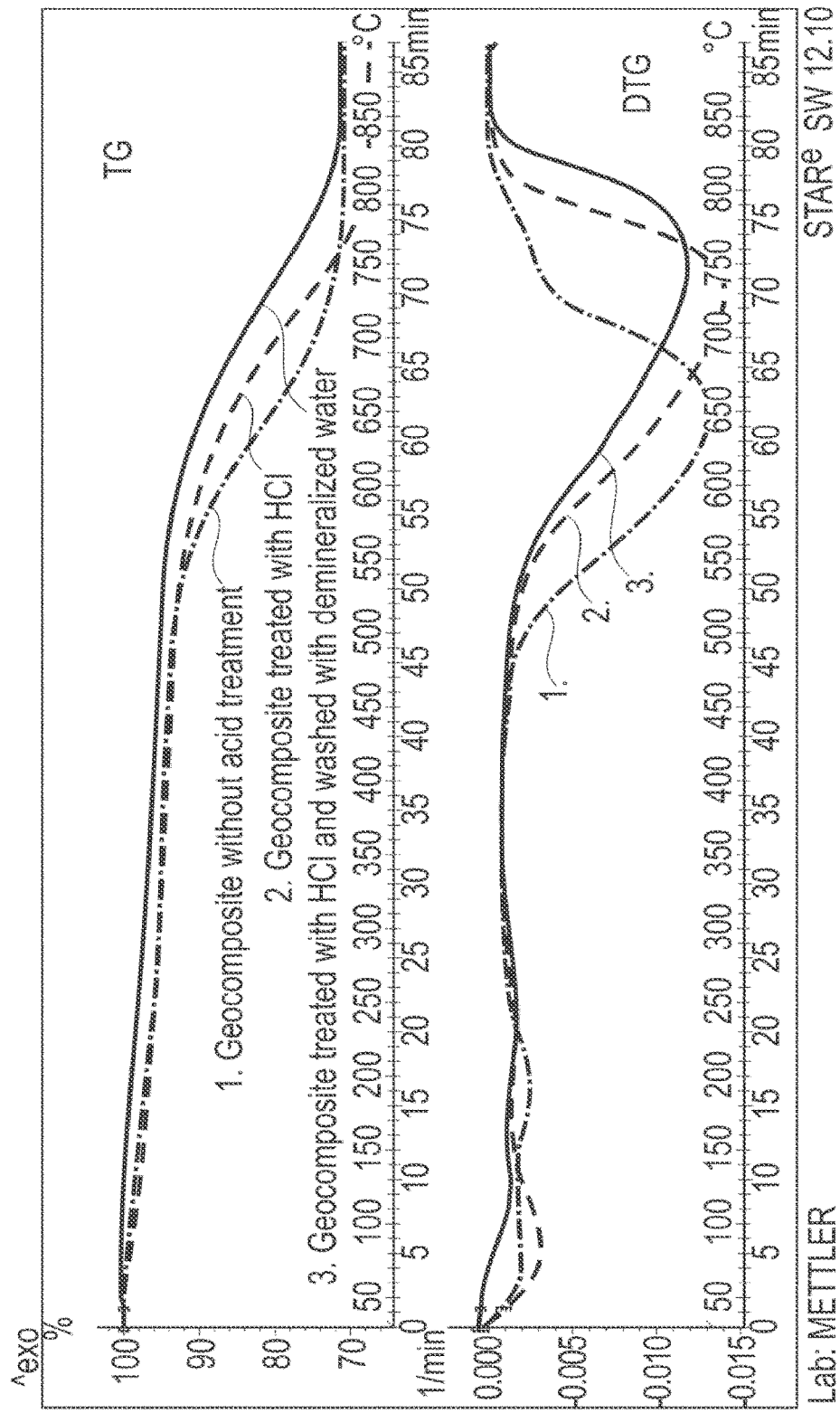
FIG. 4 shows the thermogravimetric analysis (TGA) of three geopolymer composite samples.

This example shows the advantages of the invention for the foam derived from extrusion based polymer granulate, with addition of 16 wt. % of geopolymer composite, and its preparation, and for the suspension based composite foam with addition of 10 and 5 wt. % of geopolymer composite, respectively.

1. Geopolymer Composite Preparation

The components: 572 kg of a mixture which comprises metakaolinite and calcium silicate in an optimum weight ratio (product Baucis L160 from České lupkové závody, a.s.) and 457 kg of sodium water glass were charged into a planetary mixer having a volume 2 $m^3$ and mixed over 15 min, to obtain a thixotropic pulp. Then, the athermanous additive, namely petroleum coke (Ranco 9895 from Richard Anton KG having a mean diameter particle size of 5 µm, a BET surface area of 28.7 $m^2/g$, and a sulphur content of 10,100 ppm) was added in an amount of 250 kg, and 163 l of water was added subsequently to the pulp and mixed during the next 15 min. After that, the highly viscous, homogenous pulp was discharged from the mixer do the hermetic moulds made of polypropylene (each portion was 100 kg). The moulds were transported then to the hall (polycondensation hermetic room) and placed on the racks. After 24 hours, the ready blocks (each approx. 100 kg) were removed from the moulds and again placed on the racks and warm air having a temperature of about 70° C. was pumped from the ground floor to the roof of the polycondensation hall. Under these conditions, the geopolymer composite dried over 24 h, and 25 wt. % of water excess was evaporated from the material.

The dried geopolymer composite blocks were then placed into a crushing mill to obtain the ballast form of the material. The ballast with a mean diameter of 10 mm was dried in a rotary cylindrical dryer for 30 min at a temperature of 140° C. In the next step, the ballast was milled, to obtain fine particles (powder) with a mean diameter size of 6 µm, containing D90=10 µm, D99=15 µm, D100=20 µm.

The fine powder (amount of approx. 1000 kg) was then placed in a 5 $m^3$ tank equipped with a turbine blade agitator. Immediately thereafter, 2000 l of processing water were charged into the vessel and mixing was started simultaneously. An amount of 250 kg of concentrated aqueous hydrochloric acid (37%) was then "drop wise" added to the tank over 30 min. (8.3 kg/min.). The starting pH, as measured before acid addition, was 13, after 60 min. of mixing and elution the final pH was 7.5. The water was filtrated from the powder of geopolymer composite, and a second portion of water was added to dilute remaining sodium chloride, and the slurry was mixed for 30 min. After this time, the pH increased to 7.7.

The slurry (water and powder) was then filtrated partially in filtration press and transferred to a powder drying process to remove the water and to dry the powder. After filtration, the pH of the powder was 7.2. After the powder-drying process, the fine powder possessed the same particle size distribution as after the milling process.

To improve the adhesion of petroleum coke or other carbon based athermanous additive to the geopolymer, 1 wt. % of silane (aminopropyltriethoxysilane or phenyltriethoxysilane) was added to the mixture of metakaolinite and calcium silicate (1 wt. % of silane per amount of mixture) before addition of sodium glass water, and mixed for several min. Special equipment for silanization of powders can be used, for example a twin-cone blender or a vacuum tumble dryer. Alternatively, the silanization can be performed in the slurry reactor, by using for example toluene as liquid medium.

To further improve adhesion and thus dispersion of the final geopolymer composite powder in the expandable vinyl aromatic polymer as obtained by the extrusion process, one can perform silanization of the final powder. The silane phenyltriethoxysilane can be used for this purpose, in a concentration of 1 wt. % calculated per geopolymer composite powder amount.

The mechanical properties, in particular the strength according to standard ISO 679 as used for the measurement of mechanical properties of concrete, were measured to study the influence of silane addition to the geopolymer composite on the cohesion of the composite matrix.

The geopolymer's or geopolymer composite's high ability for absorption of the blowing agent (a typical hydrocarbon) was confirmed by measurement according to standard ASTM C830-00.

2. Expandable Vinyl Aromatic Polymer Preparation Via an Extrusion Process

A mixture of vinyl aromatic polymer in the form of granules, containing 1.5 wt. % of polymeric brominated flame retardant (Emerald 3000) and 0.3 wt. % of bicumyl, were dosed to the main hopper of the main 32D/40 mm twin-screw co-rotating extruder. The melt temperature in main extruder was 180° C.

The geopolymer composite powder in a concentration of 16 wt. % (containing 25% of Ranco 9895, having a mean particle size of 6 μm and a BET surface area of 20.5 $m^2/g$) was dosed to the side arm (54D/25 mm) twin-screw co-rotating extruder via two side feeders and the vinyl aromatic polymer (in the form of granules) was dosed to the main hopper of this extruder. The melt containing 40 wt. % of concentrated geopolymer composite was transported to the main extruder. The melt temperature inside the extruder was 190° C.

The blowing agent (n-pentane/isopentane mixture 80/20%) was injected to the main 32D/40 mm extruder downstream from the injection of the melt from the side twin-screw extruder. The concentration of blowing agent was 5.5 wt. %, calculated on total mass of product.

The melt of vinyl aromatic polymer containing flame retardant, bicumyl, geopolymer composite and blowing agent was transported to the 30D/90 mm cooling extruder and pumped through a 60 mm length static mixer, melt pump, screen changer, diverter valve and extruded through the die head with 0.75 mm diameter holes, and underwater pelletized by the rotating knifes. Downstream, the rounded product, a granulate with a particle size distribution of 99.9% of the fraction 0.8-1.6 mm was centrifuged to remove the water, and was finally coated by the suitable mixture of magnesium stearate with glycerine monostearate and tristearate. The melt temperature in the cooling extruder was 170° C.

The coated beads were expanded to measure the final general properties of expanded foam composite:
  thermal conductivity according to standard ISO 8301.
  mechanical properties (compressive and bending strength) according to standard EN 13163.
  flammability according to tests methods: EN ISO 11925-2 and DIN 4102 B1, B2.
  dimensional stability under specified temperature and humidity conditions of expanded foam were determined according to standard PN-EN 1604+AC, which is normally used for XPS materials.
  the total water content in the expandable polymer particles was determined by the standard Karl Fischer titration method according to ASTM E203.

The expandable granulate with a particle size distribution 0.8 to 1.6 mm was in the pre-expander vessel treated for 50 sec. with steam having a pressure of 0.2 kPa, and was then dried in a connected fluid bed drier. The obtained beads' density was 17 $kg/m^3$. Then the expanded beads were conditioned in a silo for h and introduced to the block mould with dimensions of 1000×1000×500 mm. Steam having a pressure of 0.7 kPa was used to weld the beads, and to obtain moulded blocks having a density of 17.5 $kg/m^3$. The mould cooling time in this case was 70 sec. The ready block was cut into plates and then specimens after 6 days of conditioning at room temperature.

3. Expandable Vinyl Aromatic Polymer Preparation Via a Suspension Process

To a 50 l, 20 bar reactor vessel, equipped with frame agitator, 20 kg of styrene monomer were charged. Geopolymer composite (as produced according to Example 1 but silanized with 1 wt. % of vinyltriethoxysilane) was introduced into the reactor part-by-part in equal portions of 4 kg each. The composition was mixed, to obtain a homogenous paste, and 0.5 wt. % of benzoyl peroxide were added, as well as dicumyl peroxide in the same 0.5 wt. % concentration. The reactor was closed and a nitrogen pressure of 1 bar was established. The intensively mixed mass was heated to 100° C. and kept at that temperature for 40 min. After that, a melt pump transferred the melt to the 54D/25 mm co-rotating twin-screw extruder with the speed to provide 10 wt. % concentration of geopolymer composite in the melt. An amount of 30 wt. % per total mass of masterbatch of geopolymer composite powder (silanized with 2 wt. % of vinyltriethoxysilane) was introduced to the extruder by the side feeder before the melt from the extruder was injected. High molecular weight vinyl aromatic polymer (Mn of 80 kg/mol) was dosed to the main hopper at the first zone of extruder. In this way, the copolymer with geopolymer composite (copolymerized with styrene and grafted with polystyrene) was obtained in the form of masterbatch granules, containing 40 wt. % of geopolymer composite in the polymer matrix. High shear force and processing temperature of 190° C. set-up for all zones in extruder provided good reaction capability. A masterbatch with mean granules size of 3 mm was produced by an underwater pelletization method.

An amount of 2.15 kg of the 40 wt. % concentrated masterbatch (10 wt. % of geopolymer composite) was then placed into 6.2 kg of styrene, combined in a 20 l reactor equipped with 4-blade turbine agitator, and mixed slowly, and 0.002 wt. % of divinylbenzene, 1 wt. % of Emerald 3000, 0.3 wt. % of Polywax 1000 and 0.5 wt. % of dicumyl peroxide were then charged into the mixture.

The mixture was heated relatively quickly to a temperature of 70° C. and mixed at this temperature for 30 min with 275 rpm. Then, the temperature was increased to 90° C. and 9 l of demineralised water (temperature of 60° C.) were added. The mixing force immediately created a suspension of prepolymer and the suspension was heated to 82° C. Immediately, 0.3 wt. % of Peroxan PO and 0.5 wt. % of TBPEHC were added. The radical polymerization was started and the following surfactant composition was introduced:
  potassium persulfate—0.0001 wt. %
  Poval 205-0.18 wt. % of 5% concentrated water solution
  Poval 217 (alternatively Poval 224)—0.09 wt. % of a 5% concentrated water solution
  DCloud 45—0.1 wt. %
  Arbocel CE 2910HE50LV—0.1 wt. % (hydroxypropylmethylcellulose supplied by J. RETTENMAIER & SÖHNE GMBH)

The polymerization was then continued for 120 min. at a temperature of 82° C., and the temperature was then increased to 90° C. The suspension was kept at this temperature for 120 min. to achieve particle identity point of suspension. A further portion of Poval 217 (in a concentration of 0.3 wt. % of a 5 wt. % concentrated solution in water) was introduced and the reactor was filled with 0.5 l of demineralised water. In this step, the sodium chloride can be added in an amount of 0.5 wt. % per water phase, to reduce the water content in the polymer. Alternatively, the surfactant (sodium dodecylbenzenesulfonate, SDBS) can be used in an amount of 0.2 wt. %.

The reactor was closed and an n-pentane/isopentane 80/20% mixture in amount of 5.5 wt. % was added over 60 min. Simultaneously, the temperature was increased to 125° C. Then the polymerization was continued for 120 min. and after that time the suspension slurry was cooled down to 25° C.

The product was removed from the reactor and water was removed in a basket centrifuge. The particles were then dried in a fluid bed drier at a temperature of 40° C. for 30 min. and fractionated on 80% of particles fraction 0.8-1.6 mm, 15% of 0.3-1.3, 4% of 1.0-2.5 mm and 1% of upper and lower size. Fractions were then coated the same way as the product as obtained in the extrusion process, and then expanded to foam.

Example 2

This example is comparable to Example 1 but with a lower amount of geopolymer composite in the foam, and with a higher content of carbon based athermanous additive in the composite.

An expandable granulate was produced with the same conditions and process as in Example 1, except that 10 wt. % of geopolymer composite containing 40 wt. % of Ranco 9895 and having a mean particle size of 6 µm and BET surface of 10 m²/g was used.

Example 3

This example shows the influence of silanization on the cohesiveness of geopolymer composite and the mechanical properties of the foam. The example is comparable to Example 1.

Expandable particles were produced with the same conditions, ingredient concentrations and process as in Example 1, except that aminopropyltriethoxysilane was added in a concentration of 2 wt. % per amount of used Baucis L160. Additionally, the ready geopolymer composite powder was silanized with phenyltriethoxysilane in a concentration of 1 wt. % per dry weight of powder.

Example 4

In this example, a different athermanous additive was used. This example shows that the same or very similar foam properties can be obtained independently.

Expandable particles were produced with the same conditions and process as in Example 1, except that, instead of petroleum coke, 20 wt. % of Monarch 460 carbon black having a BET surface of 71.8 m²/g and 5600 ppm of sulphur was used to prepare the geopolymer composite. Moreover, the ready composite powder with a mean diameter 7 µm and BET surface 21.3 m²/g in concentration of 15 wt. % was added to the total composition.

Example 5

This example compares the influence of pure geopolymer addition on the structure and foam composite properties and shows that properties are very similar to those examples were geopolymer composites were used.

Expandable particles were produced with the same conditions as in Example 1, except that pure geopolymer (without addition of any athermanous filler) was prepared and added to the expandable vinyl aromatic polymer in a concentration of 10 wt. % calculated per total mass of expanded foam composite.

Example 6

This example shows that carbon-based athermanous additives (which would otherwise deteriorate the self-extinguishing properties of expanded foams made of expandable vinyl aromatic polymers) are completely inert when they are well encapsulated in the geopolymer matrix, thus a reduction of the concentration of flame retardant is advantageously possible in accordance with the invention.

Expandable particles were produced under the same conditions as in Example 1, except that the Emerald 3000 flame retardant was added in a concentration of 1 wt. %.

Example 7

This example is further focused to show that an even lower amount of flame retardant may be added when thermal and thermo-oxidative stabilizers are incorporated into the mixture.

Expandable particles were produced with the same conditions as in Example 1, except that the thermo-oxidative stabilizers were added in a concentration of 0.04 wt. % of Irgafos 126 and 0.04 wt. % of Irganox 1010, and 0.08 wt. % of Epon 164 as HBr acid scavenger, and 0.32 wt. % of F-2200 HM as thermal stabilizer for Emerald 3000 (according to ICL recommendation) were used. The flame retardant concentration was decreased down to 0.8 wt. %.

Example 8

In this example, a complex geopolymer composite was prepared and used in the preparation of expanded foam. The example was performed in particular to show the influence of geopolymer composite based on a mixture of ilmenite, rutile and carbon black on the thermal conductivity reduction of the foam.

Expandable particles were produced with the same conditions as in Example 1, except that 10 wt. % of Monarch 460, 10 wt. % of synthetic rutile from Iluka with a mean particle size of 5 µm, and 10 wt. % of ilmenite (standard grade from Titania AS, Norway with a mean particle size of 5 µm) were used to prepare the geopolymer composite with a mean particle size of 6 µm, and the geopolymer composite was used in an amount of 15 wt. %. Emerald 3000 concentration was reduced to 1.25%.

Example 9

In this example, a geopolymer composite with perovskite, a barium titanate (BaTiO₃), with small inclusion of hydromagnesite/huntite (product UltraCarb 1250) and chamotte was prepared. A very small amount of flame retardant was used then too (0.7 wt. %).

Expandable particles were produced with the same conditions as in Example 1, except that 30 wt. % of barium titanate with a mean particle size of 5 µm and 5 wt. % of hydromagnesite/huntite with a mean particle size of 2.6 µm and 5 wt. % of chamotte with a mean particle size of 6 µm from České lupkové závody, a.s. were used to prepare the geopolymer composite with a mean particle size of 6 µm, which was added in a concentration of 10 wt. %.

Example 10

In this example, the suspension process specified in Example 1, point 3 was used to prepare the expanded foam; 10 wt. % of geopolymer composite were incorporated. The organic stabilization system for suspension was used.

Example 11

In this example, the suspension was prepared according to Example 10, except that the geopolymer composite concentration was reduced to 5 wt. % and the inorganic stabilization system was based on potassium persulfate and tricalcium phosphate.

The following table (Table 1) lists the compositions of the seven different compositions of geopolymer composite used in Examples 1 to 11. Properties of the resultant geopolymer composites are shown below in Table 5.

TABLE 1

Geopolymer composite compositions.

| No. | 1 | 2 | 3 | 4 | 5 | 6 | 7 |
|---|---|---|---|---|---|---|---|
| Unit | | | | wt. % | | | |
| Silanes | | | YES | | | | |
| Geopolymer matrix (%) | 75 | 60 | 75 | 80 | 100 | 70 | 60 |
| Ranco 9895 | 25 | 40 | 25 | | | | |
| Monarch 460 | | | | 20 | | 10 | |
| Synthetic rutile | | | | | | 10 | |
| Ilmenite | | | | | | 10 | |
| Barium titanate | | | | | | | 30 |
| Hydromagnesite | | | | | | | 5 |
| Chamotte | | | | | | | 5 |

TABLE 2

Examples summary-foam from an extrusion process.

| Examples | 1 | 2 | 3 | 4 | 5 | 6 | 7 | 8 | 9 |
|---|---|---|---|---|---|---|---|---|---|
| Unit | | | | | wt. % | | | | |
| Synthos PS 585X | YES | YES | YES | YES | YES | YES | YES | YES | YES |
| Aminopropyltriethoxysilane | — | — | 1/ powder | — | — | — | | | |
| Phenyltriethoxysilane | — | — | 2/ powder | — | — | — | | | |
| Geopolymer composite | 16 | 10 | 16 | 15 | 10 | 16 | 16 | 15 | 10 |
| (type) | (1) | (2) | (3) | (4) | (5) | (1) | (1) | (6) | (7) |
| Emerald 3000 | 1.5 | 1.5 | 1.5 | 1.5 | 1.5 | 1.0 | 0.8 | 1.25 | 0.7 |
| Bicumyl | 0.3 | 0.3 | 0.3 | 0.3 | 0.3 | 0.3 | 0.18 | 0.28 | 0.16 |
| F 2200 HM | — | — | — | — | — | — | 0.32 | — | — |
| Irganox 1010 | — | — | — | — | — | — | 0.04 | — | — |
| Irgafos 126 | — | — | — | — | — | — | 0.04 | — | — |
| Epon 164 | — | — | — | — | — | — | 0.08 | — | — |
| Polywax 2000 | 0.3 | 0.3 | 0.3 | 0.3 | 0.3 | 0.3 | 0.3 | 0.3 | 0.3 |
| Pentane/Isopentane 80/20 | 5.5 | 5.5 | 5.5 | 5.5 | 5.5 | 5.5 | 5.5 | 5.5 | 5.5 |

TABLE 3

Examples summary-foam from a suspension process.

| Examples | Ex. 10 | Ex. 11 |
|---|---|---|
| Unit | wt. % | |
| Aminopropyltriethoxysilan | 1/powder | 1/powder |
| Phenyltriethoxysilane | 2/powder | 2/powder |
| Geopolymer composite (type) | 10 (1) | 5 (1) |
| Emerald 3000 | 0.7 | 0.7 |
| Polywax 1000 | 0.3 | 0.3 |
| Pentane/Isopentane 80/20 | 5.5 | 5.5 |
| Other components | According to Example 1, point 3 | |

In general, various mixtures are possible, and for all possibilities, the same or similar structure will be obtained, as well mechanical properties, foaming, and block moulding parameters. The difference will be only in thermal conductivity, as shown below in Table 4.

TABLE 4

Expanded foam composite parameters at ca. 17.0 kg/m³.

| Examples | 1 | 2 | 3 | 4 | 5 | 6 | 7 | 8 | 9 | 10 | 11 |
|---|---|---|---|---|---|---|---|---|---|---|---|
| Cell size distribution (μm) | 30/90 | 40/80 | 30/100 | 40/90 | 30/100 | 30/90 | 50/110 | 40/120 | 50/120 | 40/90 | 40/90 |
| Dimensional stability at temp. 70° C. and humidity 50 ± 5 % (% of shape change) | 0.1 | 0.5 | 0.0 | 0.2 | 0.1 | 0.0 | 0.5 | 0.3 | 0.0 | 0.5 | 0.4 |
| Thermal conductivity (mW/m · K) | 30.2 | 30.0 | 30.3 | 29.9 | 33.5 | 30.1 | 30.5 | 30.0 | 32.0 | 30.5 | 31.0 |
| Flammability (EN standard) | + | + | + | + | + | + | + | + | + | + | + |
| Flammability (DIN B1/B2 standard) | +/+ | +/+ | +/+ | +/+ | +/+ | +/+ | +/+ | +/+ | +/+ | +/+ | +/+ |
| Compressive strength at 10% def. (kPa) | 102 | 89 | 111 | 98 | 91 | 100 | 98 | 101 | 125 | 76 | 87 |
| Bending strength (kPa) | 193 | 175 | 199 | 186 | 172 | 201 | 195 | 188 | 221 | 171 | 184 |
| Water content (%) | 0.1 | 0.07 | 0.05 | 0.15 | 0.11 | 0.1 | 0.12 | 0.09 | 0.1 | 0.1 | 0.1 |

Passed (+ or B2 or B1); Not passed (− or B2 or B1)

TABLE 5

Geopolymer and geopolymer composite parameters.

| Geopolymer composite | 1 | 2 | 3 | 4 | 5 | 6 | 7 |
|---|---|---|---|---|---|---|---|
| Density (g/cm³) | 2.58 | 1.48 | 2.60 | 2.23 | 3.22 | 4.2 | 4.1 |
| Compresive strength (MPa) | 26 | 17 | 71 | 30 | 44 | 53 | 62 |
| Water content (%) | 2.5 | 1.0 | 2.0 | 4.0 | 1.9 | 2.1 | 3.1 |
| Blowing agent absorption (%) | 13.1 | 8.0 | 12.2 | 14.9 | 19.4 | 11.0 | 14.2 |

The invention claimed is:

1. Expanded vinyl polymer foam, comprising vinyl polymer and a geopolymer composite derived from geopolymer and comprising athermanous additive,
    wherein the athermanous additive comprises one or more athermanous additives selected from
    carbon black, petroleum coke, graphitized carbon black, graphite oxides, graphite and graphene,
    rutiles, chamotte, fly ash, fumed silica, hydromagnesite/huntite mineral, and mineral having perovskite structure,
    the foam having
        a density of from 8 to 30 kg/m³, and
        a thermal conductivity (as measured according to ISO 8301) of from 25 to 35 mW/K·m,
    wherein the geopolymer composite has a particle size of from 0.01 to 200 μm.

2. The expanded vinyl polymer foam of claim 1, wherein the foam comprises vinyl aromatic polymer.

3. The foam of claim 2, having a density in a range of from 8 to 14 kg/m³ and a thermal conductivity (as measured according to ISO 8301) of from 31 to 34 mW/K·m.

4. The foam of claim 2, having a density in a range of from 17 to 21 kg/m³ and a thermal conductivity (as measured according to ISO 8301) of from 28 to 31 mW/K·m.

5. The foam of claim 2, wherein the geopolymer composite is produced in a process comprising
   a) mixing of an aluminosilicate component with an alkaline silicate solution, to form a gel,
   b) adding of an athermanous additive component to the gel, to form a filled gel,
   c) mixing of the filled gel, to form filled geopolymer,
   d) curing, drying and milling, to give filled geopolymer particles,
   e) removal of cations from the filled geopolymer particles, and
   f) obtaining the geopolymer composite,
   wherein the athermanous additive comprises one or more athermanous additives selected from
   carbon black, petroleum coke, graphitized carbon black, graphite oxides, graphite and graphene,
   rutiles, chamotte, fly ash, fumed silica, hydromagnesite/huntite mineral, and mineral having perovskite structure.

6. The foam of claim 5, wherein the aluminosilicate component comprises one or more materials selected from the group consisting of metakaolin, metakaolinite, metafly ash, furnace slag, silica fume, mine tailings, pozzolan, kaolin, and building residues.

7. The foam of claim 5, wherein the aluminosilicate component comprises one or more materials selected from the group consisting of metakaolin or metakaolinite, metafly ash, silica fume.

8. The foam of claim 5, wherein the aluminosilicate component is metakaolin or metakaolinite, or a mixture thereof.

9. The foam of claim 5, wherein the athermanous additive component is carbon black, graphite, or a mixture thereof.

10. The foam of claim 5, wherein the alkaline silicate comprises one or both of sodium silicate and potassium silicate.

11. The foam of claim 5, wherein the alkaline silicate is potassium silicate.

12. The foam of claim 5, wherein silane is added to the aluminosilicate component, prior to mixing with the alkaline silicate solution in step a).

13. The foam of claim 12, wherein the silane is selected from aminopropyltriethoxysilane, aminopropyltrimethoxysilane, phenyltriethoxysilane, and mixtures thereof.

14. The foam of claim 5, wherein silane is added to the geopolymer composite, after step e).

15. The foam of claim 14, wherein silane is added to the geopolymer composite after step f).

16. The foam of claim 14, wherein the silane is selected from aminopropyltriethoxysilane, aminopropyltrimethoxysilane, phenyltriethoxysilane, and mixtures thereof.

17. The foam of claim 12, wherein the concentration of silane is in the range of from 0.01 to 10 wt. %, based on the weight of geopolymer composite.

18. The foam of claim 5, wherein step e) comprises removal of cations with an acid solution, and subsequent drying.

19. The foam of claim 5, wherein step e) comprises removal of cations with an acid solution, washing with water, and subsequent drying.

20. The foam of claim 17, wherein the concentration of silane is in the range of from 0.05 to 5 wt. %, based on the weight of geopolymer composite.

21. The foam of claim 20, wherein the concentration of silane is in the range of from 0.1 to 3 wt. %, based on the weight of geopolymer composite.

* * * * *